United States Patent
Pidaparthi et al.

(10) Patent No.: US 12,337,481 B2
(45) Date of Patent: Jun. 24, 2025

(54) WORKFLOW FOR USING TREE SEARCH-BASED APPROACH FOR PLACING BOXES ON PALLET WITH LIMITED KNOWLEDGE OF FUTURE SEQUENCE

(71) Applicant: Dexterity, Inc., Redwood City, CA (US)

(72) Inventors: Rohit Arka Pidaparthi, Mountain View, CA (US); William Arthur Clary, Palo Alto, CA (US); Neeraja Abhyankar, Menlo Park, CA (US); Jonathan Kuck, Palo Alto, CA (US); Ben Varkey Benjamin Pottayil, Foster City, CA (US); Kevin Jose Chavez, Redwood City, CA (US); Shitij Kumar, Redwood City, CA (US)

(73) Assignee: Dexterity, Inc., Redwood City, CA (US)

( * ) Notice: Subject to any disclaimer, the term of this patent is extended or adjusted under 35 U.S.C. 154(b) by 178 days.

(21) Appl. No.: 17/838,039

(22) Filed: Jun. 10, 2022

(65) Prior Publication Data

US 2022/0402133 A1    Dec. 22, 2022

Related U.S. Application Data

(60) Provisional application No. 63/211,366, filed on Jun. 16, 2021.

(51) Int. Cl.
B25J 9/16          (2006.01)
(52) U.S. Cl.
CPC .......... B25J 9/1664 (2013.01); B25J 9/1694 (2013.01)
(58) Field of Classification Search
None
See application file for complete search history.

(56) References Cited

U.S. PATENT DOCUMENTS

| 4,641,271 A | 2/1987 | Konishi |
| 4,692,876 A | 9/1987 | Tenma |

(Continued)

FOREIGN PATENT DOCUMENTS

| CN | 107000208 | 8/2017 |
| CN | 109421071 | 3/2019 |

(Continued)

OTHER PUBLICATIONS

Verma et al. A Generalized Reinforcement Learning Algorithm for Online 3D Bin-Packing . Jul. 1, 2020.

(Continued)

*Primary Examiner* — Thomas E Worden
*Assistant Examiner* — Bryant Tang
(74) *Attorney, Agent, or Firm* — Van Pelt, Yi & James LLP

(57) ABSTRACT

A robotic system is disclosed. The system includes a communication interface that receives, from one or more sensors deployed in a workspace, sensor data indicative of a current state of the workspace. The system includes one or more processors that use the sensor data to estimate a state of one or both of the pallet or other receptacle and the set of zero or more items stacked on or in the receptacle, and use the estimated state to generate or update a plan to control a robotic arm to place a next set of items on or in, or remove the next set of items from, the pallet or other receptacle, the plan comprising an ordered sequence of item placements or removals. The plan is generated or updated based at least in part by performing a bounded tree search in which a subset of possible ordered sequences is explored.

27 Claims, 11 Drawing Sheets

(56) References Cited

U.S. PATENT DOCUMENTS

| | | | |
|---|---|---|---|
| 5,175,692 A | 12/1992 | Mazouz | |
| 5,501,571 A | 3/1996 | Van Durrett | |
| 5,908,283 A | 6/1999 | Huang | |
| 5,920,480 A | 7/1999 | Nakamura | |
| 6,055,462 A | 4/2000 | Sato | |
| 7,266,422 B1 | 9/2007 | DeMotte | |
| 7,644,052 B1 | 1/2010 | Chang | |
| 8,290,617 B2 | 10/2012 | Ruge | |
| 8,504,413 B1 | 8/2013 | Rowe | |
| 9,079,305 B2 | 7/2015 | Williamson | |
| 9,102,055 B1 | 8/2015 | Konolige | |
| 9,227,323 B1 | 1/2016 | Konolige | |
| 9,315,344 B1 | 4/2016 | Lehmann | |
| 9,387,589 B2 | 7/2016 | Barajas | |
| 9,600,798 B2 | 3/2017 | Battles | |
| 9,866,815 B2 | 1/2018 | Vrcelj | |
| 9,926,138 B1 | 3/2018 | Brazeau | |
| 10,169,677 B1 | 1/2019 | Ren | |
| 10,252,870 B2 | 4/2019 | Kimoto | |
| 10,335,947 B1 | 7/2019 | Diankov | |
| 10,456,915 B1 | 10/2019 | Diankov | |
| 10,549,928 B1 * | 2/2020 | Chavez | B65G 47/905 |
| 10,576,630 B1 | 3/2020 | Diankov | |
| 10,618,172 B1 | 4/2020 | Diankov | |
| 10,647,528 B1 | 5/2020 | Diankov | |
| 10,679,379 B1 | 6/2020 | Diankov | |
| 10,696,493 B1 | 6/2020 | Diankov | |
| 10,696,494 B1 | 6/2020 | Diankov | |
| 10,722,992 B2 | 7/2020 | Wada | |
| 10,786,899 B2 | 9/2020 | Kimoto | |
| 10,953,549 B2 | 3/2021 | Diankov | |
| 10,984,378 B1 | 4/2021 | Eckman | |
| 11,020,854 B2 | 6/2021 | Kanunikov | |
| 11,077,554 B2 | 8/2021 | Arase | |
| 11,305,431 B2 | 4/2022 | Ghazaei Ardakani | |
| 11,319,166 B2 | 5/2022 | Diankov | |
| 11,472,640 B2 | 10/2022 | Diankov | |
| 11,488,323 B2 | 11/2022 | Diankov | |
| 11,591,168 B2 | 2/2023 | Diankov | |
| 11,591,169 B2 | 2/2023 | Chavez | |
| 11,794,346 B2 | 10/2023 | Diankov | |
| 11,905,115 B2 | 2/2024 | Sun | |
| 11,932,501 B2 | 3/2024 | Hau | |
| 12,157,231 B2 | 12/2024 | Kanunikov | |
| 12,162,704 B2 | 12/2024 | McCalib, Jr. | |
| 2004/0165980 A1 | 8/2004 | Huang | |
| 2005/0246056 A1 | 11/2005 | Marks | |
| 2008/0131255 A1 | 6/2008 | Hessler | |
| 2009/0069939 A1 | 3/2009 | Nagatsuka | |
| 2010/0178149 A1 | 7/2010 | Fritzsche | |
| 2010/0222915 A1 | 9/2010 | Kuehnemann | |
| 2010/0249989 A1 | 9/2010 | Baldes | |
| 2011/0122231 A1 | 5/2011 | Fujieda | |
| 2011/0231016 A1 | 9/2011 | Goulding | |
| 2013/0231778 A1 | 9/2013 | Østergaard | |
| 2013/0233116 A1 | 9/2013 | Rose | |
| 2013/0282165 A1 | 10/2013 | Pankratov | |
| 2014/0012415 A1 | 1/2014 | Benaim | |
| 2014/0343910 A1 | 11/2014 | Zheng | |
| 2015/0073588 A1 | 3/2015 | Priebe | |
| 2016/0016311 A1 | 1/2016 | Konolige | |
| 2016/0221187 A1 | 8/2016 | Bradski | |
| 2016/0272354 A1 | 9/2016 | Nammoto | |
| 2016/0355337 A1 | 12/2016 | Lert | |
| 2017/0043953 A1 | 2/2017 | Battles | |
| 2017/0246744 A1 | 8/2017 | Chitta | |
| 2017/0267467 A1 | 9/2017 | Kimoto | |
| 2018/0060765 A1 | 3/2018 | Hance | |
| 2018/0065818 A1 | 3/2018 | Gondoh | |
| 2018/0086572 A1 | 3/2018 | Kimoto | |
| 2018/0162660 A1 | 6/2018 | Saylor | |
| 2018/0304468 A1 | 10/2018 | Holz | |
| 2019/0016543 A1 | 1/2019 | Turpin | |
| 2019/0061151 A1 | 2/2019 | Namiki | |
| 2019/0091728 A1 | 3/2019 | Stratton | |
| 2019/0143504 A1 | 5/2019 | Kimoto | |
| 2019/0193956 A1 | 6/2019 | Morland | |
| 2019/0213291 A1 | 7/2019 | Higuchi | |
| 2020/0094997 A1 | 3/2020 | Menon | |
| 2020/0171653 A1 | 6/2020 | Holson | |
| 2020/0270071 A1 | 8/2020 | Chavez | |
| 2020/0376662 A1 | 12/2020 | Arase | |
| 2020/0376670 A1 | 12/2020 | Diankov | |
| 2020/0377311 A1 | 12/2020 | Diankov | |
| 2020/0377312 A1 | 12/2020 | Diankov | |
| 2020/0377315 A1 * | 12/2020 | Diankov | B65G 47/90 |
| 2020/0380722 A1 | 12/2020 | Diankov | |
| 2020/0398441 A1 | 12/2020 | Marchese | |
| 2021/0023719 A1 | 1/2021 | Alt | |
| 2021/0053216 A1 | 2/2021 | Diankov | |
| 2021/0129333 A1 | 5/2021 | Kanunikov | |
| 2021/0129334 A1 * | 5/2021 | Kanunikov | B25J 9/1671 |
| 2021/0139256 A1 | 5/2021 | Fu | |
| 2021/0170596 A1 | 6/2021 | Diankov | |
| 2021/0201221 A1 | 7/2021 | Abraham | |
| 2021/0214163 A1 | 7/2021 | Deacon | |
| 2021/0237274 A1 | 8/2021 | Diankov | |
| 2022/0219916 A1 | 7/2022 | Diankov | |
| 2022/0288787 A1 | 9/2022 | Dupree | |
| 2022/0297958 A1 | 9/2022 | Moreno | |
| 2022/0402708 A1 | 12/2022 | Pidaparthi | |
| 2022/0402709 A1 | 12/2022 | Pidaparthi | |
| 2022/0402710 A1 | 12/2022 | Pidaparthi | |
| 2022/0405439 A1 | 12/2022 | Pidaparthi | |
| 2023/0016733 A1 | 1/2023 | Diankov | |
| 2023/0278811 A1 | 9/2023 | Diankov | |

FOREIGN PATENT DOCUMENTS

| | | |
|---|---|---|
| CN | 110769985 | 2/2020 |
| CN | 112507820 | 3/2021 |
| CN | 112589791 | 4/2021 |
| CN | 112775960 | 5/2021 |
| DE | 102010022357 | 7/2014 |
| DE | 102020114577 | 5/2022 |
| JP | 6771799 | 10/2020 |
| JP | 7362755 | 10/2023 |
| TW | 201914782 | 4/2019 |
| TW | 202040502 | 11/2020 |
| TW | 202113706 | 4/2021 |

OTHER PUBLICATIONS

Braunl et al. "Fault-Tolerant Robot Programming through Simulation with Realistic Sensor Models." In: Sage Journals, Jun. 1, 2006, [online] [retrieved on Sep. 27, 2022 (Sep. 27, 2022)] Retrieved from the Internet< URL: https://journals.sagepub.com/doi/10.5772/5750>, entire document.

Verma et al. "A Generalized Reinforcement Learning Algorithm for Online 3D Bin-Packing." In: Cornell University Library/Computer Science / Artificial Intelligence, Jul. 1, 2020, [online] [retrieved on Sep. 28, 2022 (Sep. 28, 2022)] Retrieved from the Internet < URL: https://arxiv.org/abs/2007.00463 >, entire document.

Balakirsky et al. 'Using Simulation to Assess the Effectiveness of Pallet Stacking Methods', Nov. 31, 2010 (Nov. 31, 2010), [online], retrieved from <URL: https://www.researchgate.net/publication/220850165_Using_Simulation_to_Assess_the_Effectiveness_of_Pallet_Stacking_Methods>, entire document.

Schuster et al: "Stable Stacking for the Distributor's Pallet Packing Problem", Intelligent Robots and Systems (IROS), 2010 IEEE/RSJ International Conference On, IEEE, Piscataway, NJ, USA, Oct. 18, 2010 (Oct. 18, 2010), pp. 3646-3651, XP031888390, DOI: 10.1109/IROS.2010.5650217 ISBN: 978-1-4244-6674-0.

* cited by examiner

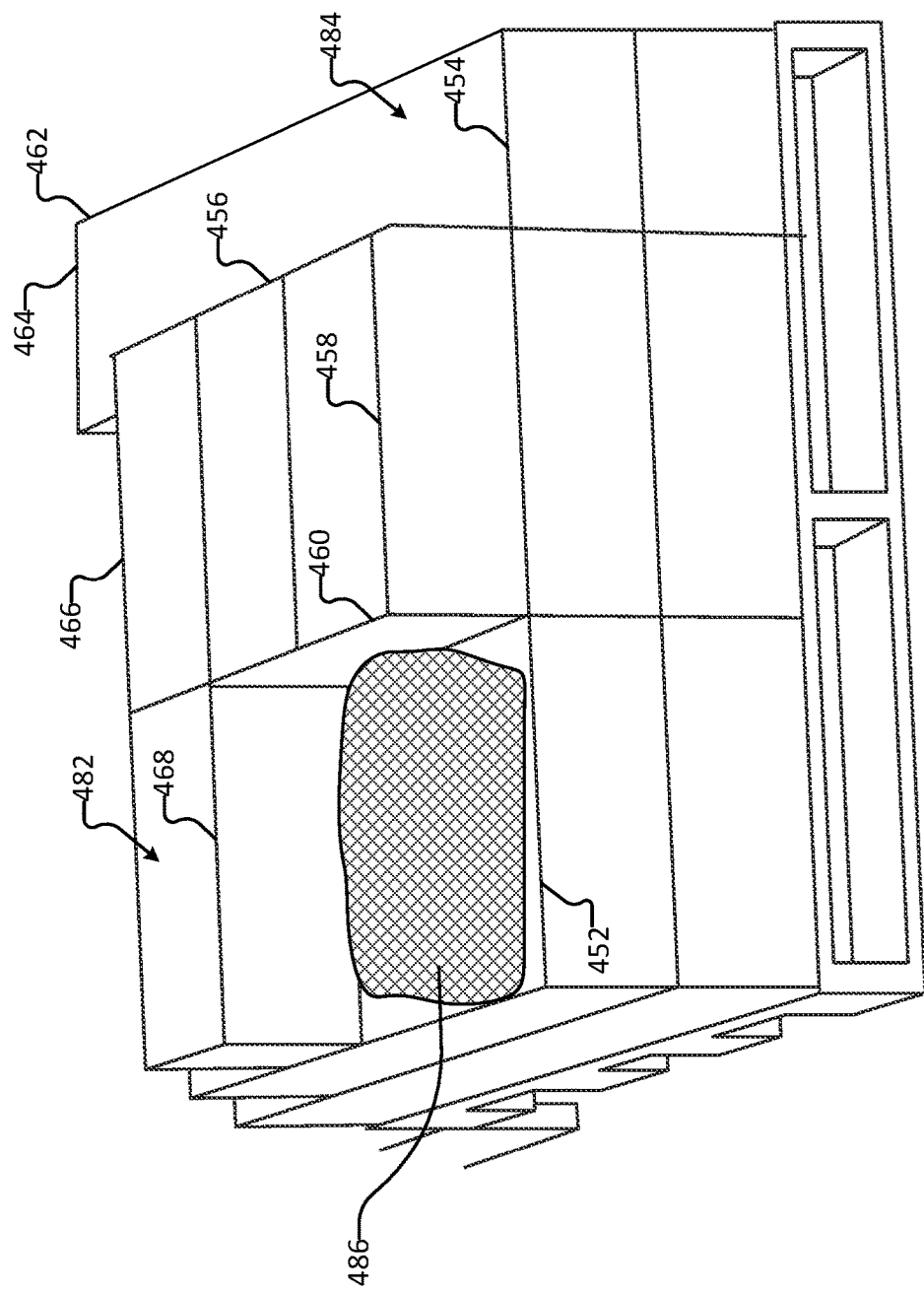

WORKFLOW FOR USING TREE SEARCH-BASED APPROACH FOR PLACING BOXES ON PALLET WITH LIMITED KNOWLEDGE OF FUTURE SEQUENCE

CROSS REFERENCE TO OTHER APPLICATIONS

This application claims priority to U.S. Provisional Patent Application No. 63/211,366 entitled WORKFLOW FOR USING TREE SEARCH BASED APPROACH FOR PLACING BOXES ON PALLET WITH LIMITED KNOWLEDGE OF FUTURE SEQUENCE filed Jun. 16, 2021 which is incorporated herein by reference for all purposes.

BACKGROUND OF THE INVENTION

Shipping and distribution centers, warehouses, shipping docks, air freight terminals, big box stores, and other activities that ship and receive non-homogeneous sets of items use strategies such as packing and unpacking dissimilar items in boxes, crates, containers, conveyor belts, and on pallets, etc. Packing dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.).

In some contexts, items may be so dissimilar in size, weight, density, bulkiness, rigidity, strength of packaging, etc. that any given item or set of items may or may not have attributes that would enable those items to support the size, weight, distribution of weight, etc., of a given other item that might be required to be packed (e.g., in a box, container, pallet, etc.). When assembling a pallet or other set of dissimilar items, items must be selected and stacked carefully to ensure the palletized stack does not collapse, lean, or otherwise become unstable (e.g., so as not to be able to be handled by equipment such as a forklift, etc.) and to avoid item damage.

Use of robotics is made more challenging in many environments due to the variety of items, variations in the order, number, and mix of items to be packed, on a given pallet for example, and a variety of types and location of container and/or feed mechanism from which items must be picked up to be placed on the pallet or other container.

BRIEF DESCRIPTION OF THE DRAWINGS

Various embodiments of the invention are disclosed in the following detailed description and the accompanying drawings.

FIG. 4D is a diagram of a stack of items with potential placements according to various embodiments.

DETAILED DESCRIPTION

Figure 1:
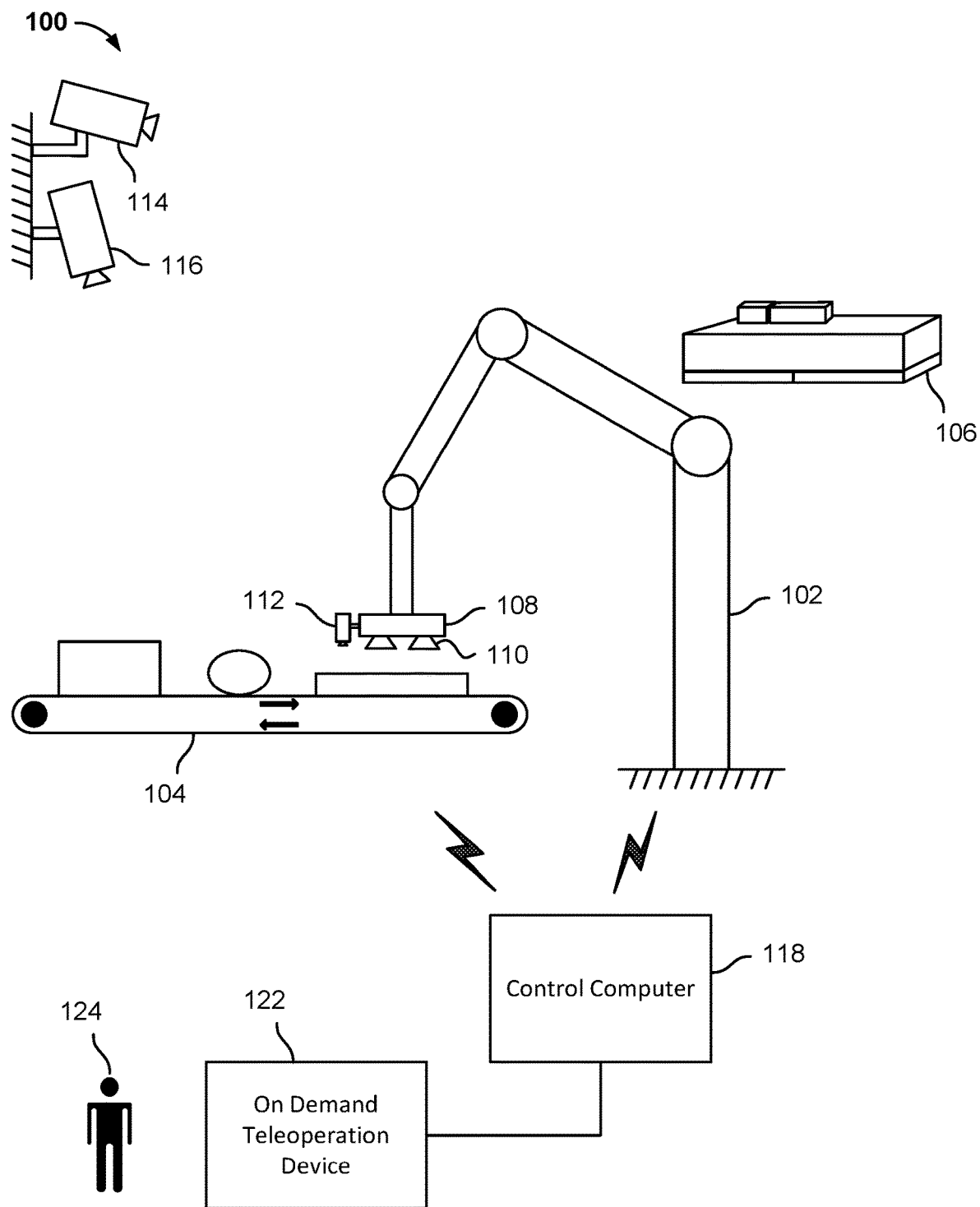
FIG. 1 is a diagram illustrating a robotic system to palletize and/or depalletize heterogeneous items according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a geometric model may mean a model of a state of a workspace such as a programmatically determined state. For example, the geometric model is generated using geometric data determined in connection with generating a plan to move an item in the workspace and an expected result if the item was moved according to plan. For example, a geometric model corresponds to a state of a workspace that is modified by controlling a robotic arm to pick, move, and/or place items within the workspace, and the picking, moving, and placing of the item is deemed to be performed according to plan (e.g., without error such as error or noise that may be introduced based on (i) a mis-configuration or mis-alignment of the robotic arm or another component in the workspace, (ii) a deforming of the item based on interaction with the robotic arm, (iii) another item in the workspace, another object in the workspace, (iv) a collision between the robotic arm, or item being moved by the robotic arm, and another object in the workspace, etc.).

As used herein, "pallet" includes a platform, receptacle, or other container on, or in, which one or more items may be stacked or placed. Further, as used herein, the pallet may be used in connection with packaging and distributing a set of one or more items. As an example, the term pallet includes the typical flat transport structure that supports items and that is movable via a forklift, a pallet jack, a crane, etc. A pallet, as used herein, may be constructed of various materials including wood, metals, metal alloys, polymers, etc.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure. An example palletization/depalletization system and/or process for palletizing/de-palletizing a set of items is further described in U.S. patent application Ser. No. 17/343,609, the entirety of which is hereby incorporated herein for all purposes.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor. An example of a singulation system and/or process for singulating a set of items is further described in U.S. patent application Ser. No. 17/246,356, the entirety of which is hereby incorporated herein for all purposes.

As used herein, kitting includes the picking of one or more items/objects from corresponding locations and placing the one or more items in a predetermined location in a manner that a set of the one or more items corresponds to a kit. An example of a kitting system and/or process for kitting a set of items is further described in U.S. patent application Ser. No. 17/219,503, the entirety of which is hereby incorporated herein for all purposes.

As used herein, a vision system includes one or more sensors that obtain sensor data, for example, sensor data pertaining to a workspace. Sensors may include one or more of a camera, a high-definition camera, a 2D camera, a 3D (e.g., RGBD) camera, an infrared (IR) sensor, other sensors to generate a three-dimensional view of a workspace (or part of a workspace such as a pallet and stack of items on the pallet), any combination of the foregoing, and/or a sensor array comprising a plurality of sensors of the foregoing, etc. An example of a vision system is further described in U.S. patent application Ser. No. 16/667,661, the entirety of which is hereby incorporated herein for all purposes.

Various embodiments include a system, method, and/or device for picking and placing items. The system includes a communication interface and one or more processors coupled to the communication interface. The communication interface is configured to receive, from one or more sensors deployed in a workspace, sensor data indicative of a current state of the workspace, the workspace comprising a pallet or other receptacle and a set of zero or more items stacked on or in the receptacle. The one or more processors are coupled to the communication interface and configured to (i) use the sensor data to estimate a state of one or both of the pallet or other receptacle and zero or more items stacked on or in the receptacle, and (ii) use the estimated state to generate or update a plan to control a robotic arm to place a next set of items on or in, or remove the next set of items from, the pallet or other receptacle, the plan comprising an ordered sequence of item placements or removals. The plan is generated or updated at least in part by performing a bounded tree search in which a subset of possible ordered sequences is explored. The subset is determined by one or both of selecting for exploration tree branches that satisfy one or more selection criteria or omitting from consideration one or more branches that satisfy a pruning criteria.

In various embodiments, a robotic palletization system as disclosed herein determines a location at which to place a current item by considering not only the current item but also a next or future item (or a predefined number of next items). The system determines a location at which to place the current item based on (i) an estimated state of the pallet or stack of items, and (ii) determined combinations/permutations of placements of the current item and the next item (or predefined number of next items). In some embodiments, the system uses a scoring function (e.g., a function that scores a placement, and that may be an inverse of, or negatively related to, a corresponding cost function) in connection with determining a best placement of the current item (e.g., the first next item).

Some challenges arising from the use of knowledge of a future sequence of items to be palletized include:

Each item may be placed in one of several locations and/or several orientations on the pallet/stack of items. To determine a plan to place the item at a particular location and/or in a particular orientation based at least in part on some optimization (e.g., packing density, time to move the item, etc.) may include determining/simulating outcomes of different possible scenarios. The determining/simulating the different outcomes may be computationally burdensome/inefficient.

If one or more future items are considered when determining, from among a plurality of locations, a location at which a current and/or a future item(s) is to be placed, the computational burden to determine/simulate outcomes of different possible scenarios for placing each item at each possible location becomes exponentially cumbersome. As an example, suppose the system knows the sequence of the next 5 boxes (e.g., items) and suppose the system can place the 1st box in 4 placements (e.g., 4 different combinations of locations and orientations). The system may simulate all 4 placements, and then the system expands the search for the next box with 4 more placements. After a 2 depth search, the system reaches 16 possible scenarios. This number of scenarios grows exponentially and is not tractable with a higher depth of search.

Various embodiments include a system that uses a tree-search in connection with determining a location at which to place one or more items (e.g., a current item and/or one or more future items in a sequence of items). The system explores a tree corresponding to different scenarios in connection with determining the location at which to place the one or more items (e.g., to find a best or optimal arrangement of the one or more items, or the pallet, etc.). The different scenarios may respectively correspond to an arrangement of one or more items at corresponding locations on the pallet/stack of items. In some embodiments, the system explores the tree to a certain depth. The depth to which the system explores the tree may be predefined or may be based at least in part on a threshold such as a threshold pertaining to a computational load to explore a particular branch/scenario.

According to various embodiments, the system determines a search space corresponding to states according to various placements of a set of items. Evaluation of the entire search space can be computationally expensive and add undesirable latency to determining a plan to pick and place an item. In order to reduce the computational complexity (and requisite resources/time) of assessing the various combinations/permutations of placements for a set of items, the system implements a pruning process/technique to reduce the number of combinations/permutations to be considered. The system can prune the search space to remove placements for which an expected stability does not satisfy a stability condition (e.g., an expected stability is less than a stability threshold, a heuristic indicates that the estimated state would be deemed unstable, etc.). After pruning the search space, the system can assess the remaining combinations/permutations of placements to determine a placement that yields a best result (e.g., a best placement determined based on one or more of an expected stability and a cost function, etc.). The system uses the placement that yields a best result to determine a plan for picking and placing an item (e.g., a next item in the set of items).

According to various embodiments, the system performs a simulation of a placement for at least a subset of the combinations/permutations of placements (e.g., at each node in a tree structure representing the search space), and the system determines a corresponding expected stability for each simulation. In some embodiments, the system bounds the search space based on a combination of (i) simulating a subset of placements and assessing a resulting expected stability, and (ii) determining, for a subset of placements, whether the placements are expected to yield a stable stack based on one or more predefined heuristics. The system can bound the search space based on one or more heuristics or simulation of a placement(s). In various embodiments, the system uses one or more rules or heuristics in connection with analyzing the search space (e.g., bounding/pruning the search space). For example, a domain expert may define one or more rules or heuristics to prune, based on observations, judgments, etc., as to which sorts of placements or sequences of placements are more or less likely to be worthwhile to consider.

Various embodiments comprise a system that picks and places a set of items to form a pallet that is stable and space efficient. In some embodiments, the system determines a location at which to place the set of items (e.g., a manner in which the set of items are arrange on a pallet) in order to maximize a predetermined scoring function (or minimize a predetermined cost function).

FIG. 1 is a diagram illustrating a robotic system to palletize and/or depalletize heterogeneous items according to various embodiments. In some embodiments, system 100 implements at least part of process 200 of FIG. 2, process 300 of FIG. 3, process 500 of FIG. 5, process 600 of FIG. 6, process 700 of FIG. 7, and/or process 800 of FIG. 8.

In the example shown, system 100 includes a robotic arm 102. In this example the robotic arm 102 is stationary, but in various alternative embodiments, robotic arm 102 may be fully or partly mobile, e.g., mounted on a rail, fully mobile on a motorized chassis, etc. As shown, robotic arm 102 is used to pick arbitrary and/or dissimilar items (e.g., boxes, packages, etc.) from a conveyor (or other source) 104 and stack them on a pallet (e.g., platform or other receptacle) 106. The pallet (e.g., platform or other receptacle) 106 may comprise a pallet, a receptacle, or base with wheels at the four corners and at least partially closed on three of four sides, sometimes referred to as a three-sided "roll pallet," "roll cage," and/or "roll" or "cage" "trolley." In other embodiments, a roll or non-wheeled pallet with more, fewer, and/or no sides may be used. In some embodiments, other robots not shown in FIG. 1 may be used to push receptacle 106 into position to be loaded/unloaded and/or into a truck or other destination to be transported, etc.

In some embodiments, a plurality of receptacles 106 may be disposed around robotic arm 102 (e.g., within a threshold proximity or otherwise within range of the robotic arm). The robotic arm 102 may simultaneously (e.g., concurrently and/or contemporaneously) stack one or more items on the plurality of pallets. Each of the plurality of pallets may be associated with a manifest and/or order. For example, each of the pallets may be associated with a preset destination (e.g., customer, address, etc.). In some instances, a subset of the plurality of pallets may be associated with a same manifest and/or order. However, each of the plurality of pallets may be associated with different manifests and/or orders. Robotic arm 102 may place a plurality of items respectively corresponding to a same order on a plurality of pallets. System 100 may determine an arrangement (e.g., a stacking of items) on the plurality of pallets (e.g., how the plurality of items for an order are to be divided among the plurality of pallets, how the items on any one pallet are to be stacked, etc.). System 100 may store one or more items (e.g., item(s) for an order) in a buffer or staging area while one or more other items are stacked on a pallet. As an example, the one or more items may be stored in the buffer or staging area until such time that system 100 determines that the respective placement of the one or more items on the pallet (e.g., on the stack) satisfies (e.g., exceeds) a threshold fit or threshold stability. The threshold fit or threshold stability may be a predefined value or a value that is empirically determined based at least in part on historical information. A machine learning algorithm may be implemented in connection with determining whether placement of an item on a stack is expected to satisfy (e.g., exceeds) a threshold fit or threshold stability, and/or in connection with determining the threshold fit or threshold stability (e.g., the thresholds against which a simulation or model is measured to assess whether to place the item on the stack).

In the example shown, robotic arm 102 is equipped with a suction-type end effector (e.g., end effector 108). End effector 108 has a plurality of suction cups 110. Robotic arm 102 is used to position the suction cups 110 of end effector 108 over an item to be picked up, as shown, and a vacuum source provides suction to grasp the item, lift the item from conveyor 104, and place the item at a destination location on receptacle 106. Various types of end effectors may be implemented.

In various embodiments, system 100 comprises a vision system that is used to generate a model of the workspace (e.g., a 3D model of the workspace and/or a geometric model). For example, one or more of 3D or other camera(s) 112 mounted on end effector 108 and cameras 114, 116 mounted in a space in which system 100 is deployed are used to generate image data used to identify items on conveyor 104 and/or to determine a plan to grasp, pick/ place, and stack the items on receptacle 106 (or place the item in the buffer or staging area, as applicable). In various embodiments, additional sensors not shown may be used to identify (e.g., determine) attributes of an item, grasp the item, pick up the item, move the item through a determined trajectory, and/or place the item in a destination location on or in receptacle 106 items on conveyor 104 and/or other sources and/or staging areas in which items may be located and/or relocated, e.g., by system 100. Examples of such additional sensors not shown may include weight or force sensors embodied in and/or adjacent to conveyor 104 and/or robotic arm 102, force sensors in the x-y plane and/or z-direction (vertical direction) of suction cups 110.

In the example shown, cameras 112 are mounted on the side of the body of end effector 108, but in some embodiments, cameras 112 and/or additional cameras may be mounted in other locations, such as on the underside of the body of end effector 108, e.g., pointed downward from a position between suction cups 110, or on segments or other structures of robotic arm 102, or other locations. In various embodiments, cameras such as 112, 114, and 116 may be used to read text, logos, photos, drawings, images, markings, barcodes, QR codes, or other encoded and/or graphical information or content visible on and/or comprising items on conveyor 104.

In some embodiments, system 100 comprises a dispenser device (not shown) that is configured to dispense a quantity of spacer material from a supply of spacer material in response to the control signal. The dispenser device may be disposed on robotic arm 102 or within proximity of the workspace (e.g., within a threshold distance of the workspace). For example, the dispenser device may be disposed within the workspace of robotic arm 102 such that the dispenser device dispenses spacer material on or around receptacle 106 (e.g., pallet), or within a predetermined distance of end effector 108 of robotic arm 102. In some embodiments, the dispenser device comprises a mounting hardware configured to mount the dispenser device on or adjacent to an end effector 108 of robotic arm 102. The mounting hardware is at least one of a bracket, a strap, and one or more fasteners, etc. As an example, the dispenser device may comprise a biasing device/mechanism that biases supply material within the dispenser device to be ejected/dispensed from the dispenser device. The dispenser device may include a gating structure that is used to control the dispensing of spacer material (e.g., to prevent spacer material to be dispensed without actuation of the gating structure, and to permit dispensing of the spacer material to be dispensed in response to actuation).

The dispenser device may comprise a communication interface configured to receive a control signal. For example, the dispenser device may be in communication with one or more terminals such as control computer 118. The dispenser device may communicate with the one or more terminals via one or more wired connections and/or one or more wireless connections. In some embodiments, the dispenser device communicates information to the one or more terminals. For example, the dispenser device may send to control computer 118 an indication of a status of the dispenser device (e.g., an indication of whether the dispenser device is operating normally), an indication of a type of spacer material comprised in the dispenser device, an indication of a supply level of the spacer material in the dispenser device (e.g., an indication of whether the dispenser device is full, empty, half full, etc.), etc. Control computer 118 may be used in connection with controlling the dispenser device to dispense a quantity of spacer material. For example, control computer 118 may determine that a spacer is to be used in connection with palletizing one or more items, such as to improve an expected stability of the stack of items on/in receptacle 106. Control computer 118 may determine the quantity of spacer material (e.g., a number of spacers, an amount of spacer material, etc.) to use in connection with palletizing the one or more items. For example, the quantity of spacer material to use in connection with palletizing the one or more items may be determined based at least in part on determining a plan for palletizing the one or more items.

In some embodiments, the dispenser device comprises an actuator configured to dispense a quantity of spacer material from a supply of spacer material in response to the control signal. In response to determining that a spacer/spacer material is to be used in connection with palletizing one or more items, control computer 118 may generate the control signal to cause the actuator to dispense the quantity of spacer material. The control signal may comprise an indication of the quantity of spacer material to be used as the spacer.

According to various embodiments, a spacer or a spacer material is a rigid block. For example, a spacer or a spacer material may be a rigid block of foam. In some embodiments, a spacer or a spacer material comprises polyurethane.

In some embodiments, the supply of spacer material comprises a plurality of precut blocks. The plurality of precut blocks may be preloaded into a spring-loaded cartridge that biases the plurality of precut blocks to a dispensing end. In response to a precut block being dispensed from the cartridge, another of the plurality of precut blocks is pushed to a next-in-line position to be dispensed from the cartridge.

In some embodiments, the supply of spacer material comprises one or more of a larger block of spacer material, a strip of spacer material, and a roll of spacer material. The dispenser device or system 100 may comprises a cutter that is configured to cut the quantity of spacer material from the supply of the spacer material. In response to the control signal being provided to the actuator, the actuator may cause the cutter to cut the quantity of the spacer material from the supply of the spacer material.

In some embodiments, the supply of the spacer material comprises a liquid precursor. In response to the control signal being provided to the actuator, the actuator causes the quantity of the spacer material to be dispensed onto a surface of a pallet or a stack of items on the pallet. The dispensed precursor may harden after being dispensed onto the surface of the pallet or the stack of items on the pallet.

In some embodiments the supply of spacer material comprises an extruded material. In response to the control signal being provided to the actuator, the extruded material is filled to one or more of a desired size and a desired firmness. The extruded material may be sealed in response to a determination that the extruded material is filled to the one or more of the desired size and the desired firmness. In some embodiments, the extruded material is filled with a fluid. The fluid may be one or more of air, water, etc. In some embodiments, the extruded material is filled with a gel.

In various embodiments, a robotically controlled dispenser tooling or machine fills the void between and/or adjacent to boxes to prepare the surface area for the next box/layer being placed. In some embodiments, system 100 may use a robotic arm 102 to pick/place predefined cut material and/or may dynamically trim the spacer material to fit the need of the surface area of the next item being placed. In some embodiments, the robotically controlled dispenser device or the robotic palletization system comprising the robotically controlled dispenser device comprises a device to trim to size a rectangular solid from a long tube and/or packaging, and place the rectangular solid on an existing pallet in connection with preparing the surface area for a next box or item which the system determines may not normally fit on the pallet surface area (e.g., on an upper surface of a previous layer). The spacer may include, without limitation, foam, an inflated air plastic packet, wood, metal, plastic, etc. The dispenser device may place (e.g., eject, dispense, etc.) the rectangular solid (e.g., the spacer) on the pallet directly, and/or the device may dispense the rectangular solid (e.g., the spacer) in proximity of the robotic arm, and the end effector may reposition/place the rectangular solid (e.g., the spacer) on the pallet surface area. The dispenser device may dispense a predetermined amount (e.g., a correct amount or an expected amount) of the spacer material to correct or improve the surface area discrepancy between boxes or items on the layer (e.g., on the upper surface of the layer) to prepare the surface area for a next box or item.

Referring further to FIG. 1, in the example shown, robotic system 100 includes a control computer 118 configured to communicate, in this example, via wireless communication (but in one or both of wired and wireless communication in various embodiments) with elements such as robotic arm 102, conveyor 104, end effector 108, and sensors, such as cameras 112, 114, and 116 and/or weight, force, and/or other sensors not shown in FIG. 1. In various embodiments, control computer 118 is configured to use input from sensors, such as cameras 112, 114, and 116 and/or weight, force, and/or other sensors not shown in FIG. 1, to view, identify, and determine one or more attributes of items to be loaded into and/or unloaded from receptacle 106. In various embodiments, control computer 118 uses item model data in a library stored on and/or accessible to control computer 118 to identify an item and/or its attributes, e.g., based on image and/or other sensor data. Control computer 118 uses a model corresponding to an item to determine and implement a plan to stack the item, along with other items, in/on a destination, such as receptacle 106. In various embodiments, the item attributes and/or model is used to determine a strategy to grasp, move, and place an item in a destination location, e.g., a determined location at which the item is determined to be placed as part of a planning/replanning process to stack items in/on the receptacle 106.

In the example shown, control computer 118 is connected to an "on demand" teleoperation device 122. In some embodiments, if control computer 118 cannot proceed in a fully automated mode, for example, a strategy to grasp, move, and place an item cannot be determined and/or fails in a manner such that control computer 118 does not have a strategy to complete picking and placing the item in a fully automated mode, then control computer 118 prompts a human user 124 to intervene, e.g., by using teleoperation device 122 to operate the robotic arm 102 and/or end effector 108 to grasp, move, and place the item.

A user interface pertaining to operation of system 100 may be provided by control computer 118 and/or teleoperation device 122. The user interface may provide a current status of system 100, including information pertaining to a current state of the pallet (or stack of items associated therewith), a current order or manifest being palletized or de-palletized, a performance of system 100 (e.g., a number of items palletized/de-palletized by time), etc. A user may select one or more elements on the user interface, or otherwise provide an input to the user interface, to activate or pause system 100 and/or a particular robotic arm in system 100.

According to various embodiments, system 100 implements a machine learning process to model a state of a pallet such as to generate a model of a stack on the pallet. The machine learning process may include an adaptive and/or dynamic process for modeling the state of the pallet. The machine learning process may define and/or update/refine a process by which system 100 generates a model of the state of the pallet. The model may be generated based at least in part on input from (e.g., information obtained from) one or more sensors in system 100 such as one or more sensors or sensor arrays within the workspace of robotic arm 102. The model may be generated based at least in part on a geometry of the stack, a vision response (e.g., information obtained by one or more sensors in the workspace), and the machine learning processes, etc. System 100 may use the model in connection with determining an efficient (e.g., maximizing/optimizing an efficiency) manner for palletizing/de-palletizing one or more items, and the manner for palletizing/de-palletizing may be bounded by a minimum threshold stability value. The process for palletizing/de-palletizing the one or more items may be configurable by a user administrator. For example, one or more metrics by which the process for palletizing/de-palletizing is maximized may be configurable (e.g., set by the user/administrator).

In the context of palletizing one or more items, system 100 may generate the model of the state of the pallet in connection with determining whether to place an item on the pallet (e.g., on the stack), and selecting a plan for placing the item on the pallet, including a destination location at which the item is to be placed and a trajectory along which the item is to be moved from a source location (e.g., a current destination such as a conveyor) to the destination location. System 100 may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. System 100 may select a destination location for which the expected fit and/or expected stability satisfies (e.g., exceeds) a corresponding threshold value. Additionally, or alternatively, system 100 may select a destination location that optimizes the expected fit (e.g., of the item on the stack) and/or expected stability (e.g., of the stack).

Conversely, in the context of de-palletizing one or more items from a pallet (e.g., a stack on the pallet), system 100 (e.g., control computer 118) may generate the model of the state of the pallet in connection with determining whether to remove an item on the pallet (e.g., on the stack), and selecting a plan for removing the item from the pallet. The model of the state of the pallet may be used in connection with determining an order in which items are removed from the pallet. For example, control computer 118 may use the model to determine whether removal of an item is expected to cause stability of the state of the pallet (e.g., the stack) to drop below a threshold stability. System 100 (e.g., control computer 118) may simulate removal of one or more items from the pallet and select an order for removing items from the pallet that optimizes the stability of the state of the pallet (e.g., the stack). System 100 may use the model to determine a next item to remove from the pallet. For example, control computer 118 may select an item as a next item to remove from the pallet based at least in part on a determination that an expected stability of the stack during and/or after removal of the item exceeds a threshold stability. The model and/or the machine learning process may be used in connection with determining strategies for picking an item from the stack. For example, after an item is selected to be the next item to remove from the stack, system 100 may determine the strategy for picking the item. The strategy for picking the item may be based at least in part on the state of the pallet (e.g., a determined stability of the stack), an attribute of the item (e.g., a size, shape, weight or expected weight, center of gravity, type of packaging, etc.), a location of the item (e.g., relative to one or more other items in the stack), an attribute of another item on the stack (e.g., an attribute of an adjacent item, etc.), etc.

According to various embodiments, a machine learning process is implemented in connection with improving grasping strategies (e.g., strategies for grasping an item). System 100 may obtain attribute information pertaining to one or more items to be palletized/de-palletized. The attribute information may comprise one or more of an orientation of the item, a material (e.g., a packaging type), a size, a weight (or expected weight), or a center of gravity, etc. System 100 may also obtain a source location (e.g., information pertaining to the input conveyor from which the item is to be picked), and may obtain information pertaining to a pallet on which the item is to be placed (or set of pallets from which the destination pallet is to be determined such as a set of pallets corresponding to the order for which the item is being stacked). In connection with determining a plan for picking and placing the item, system 100 may use the information pertaining to the item (e.g., the attribute information, destination location, etc.) to determine a strategy for picking the item. The picking strategy may include an indication of a picking location (e.g., a location on the item at which the robotic arm 102 is to engage the item such as via the end effector). The picking strategy may include a force to be applied to pick the item and/or a holding force by which the robotic arm 102 is to grasp the item while moving the item from a source location to the destination location. System 100 may use machine learning processes to improve the picking strategies based at least in part on an association between information pertaining to the item (e.g., the attribute information, destination location, etc.) and performance of picking the item (e.g., historical information associated with past iterations of picking and placing the item or similar items such as items sharing one or more similar attributes).

According to various embodiments, system 100 may determine to use a spacer or a quantity of the spacer material in connection with palletizing one or more items in response to a determination that the use of the spacer or quantity of the spacer material will improve the result of an improved stack of items on the pallet (e.g., improve the stability of the stack of items). In some embodiments, the determination that the placing of the one or more spacers in connection with placing the set of N items on the pallet will result in an improved stack of items on the pallet is based at least in part on one or more of a packing density, a level top surface, and a stability. In some embodiments, the determination that the placing of the one or more spacers in connection with placing the set of N items on the pallet will result in an improved stack of items on the pallet is based at least in part on a determination that a packing density of the stack of items with the set of N items is higher than a packing density if the set of N items are placed on the pallet without the one or more spacers. In some embodiments, the determination that the placing of the one or more spacers in connection with placing the set of N items on the pallet will result in an improved stack of items on the pallet is based at least in part on a determination that a top surface is more level than a top surface if the set of N items are placed on the pallet without the one or more spacers. In some embodiments, the determination that the placing of the one or more spacers in connection with placing the set of N items on the pallet will result in an improved stack of items on the pallet is based at least in part on a determination that a stability of the stack of items with the set of N items is higher than a stability if the set of N items is placed on the pallet without the one or more spacers. N may be a positive integer (e.g., a positive integer less than a total number of items that are to be palletized in the complete pallet).

As an example, because N may be less than a total number of items that are to be palletized, system 100 may be limited in its optimization of the stack of items (e.g., robotic system 100 may only plan the placement of N items at a time). Accordingly, the use of one or more spacers increases the number of degrees of freedom associated with placing the N items. System 100 may use one or more spacers to optimize the stacking of the N items (or to achieve a "good enough" stack with the N items such as a stack that satisfies a minimum stability threshold). System 100 may use a cost function in connection with determining whether to use one or more spacers, a number of spacers to use, a placement of the spacers, etc. For example, the cost function may include one or more of a stability value, a time to place the one or more items, a packing density of the stack of items, a flatness value or degree of variability of the top of the upper surface of the stack of items, and a cost of supply material, etc.

According to various embodiments, control computer 118 controls system 100 to place a spacer on a receptacle 106 (e.g., a pallet) or a stack of items in connection with improving a stability of the stack of items on the receptacle 106. As an example, the spacer may be placed in response to a determination that a stability of the stack of items is estimated (e.g., likely such as a probability that exceeds a predefined likelihood threshold value) to be improved if the spacer is used. As another example, control computer 118 may control robotic system 100 to use the spacer in response to a determination that a stability of the stack of items is less than a threshold stability value, and/or that the stability of the stack of items is estimated to be less than a threshold stability value in connection with the placement of a set of items (e.g., a set of N items, N being an integer).

According to various embodiments, control computer 118 may determine the stability of a stack of items based at least in part on a model of a stack of items and/or a simulation of placing a set of one or more items. A computer system may obtain (e.g., determine) a current model of a stack of items, and model (e.g., simulate) the placing of a set of item(s). In connection with modeling the stack of items, an expected stability of the stack of items may be determined. The modelling of the stack of items may include modelling the placement of a spacer in connection with the modelling of the placement of the set of item(s).

In some embodiments, control computer 118 may determine the stability of the stack of items (or simulated stack of items) based at least in part on one or more attributes of a top surface of the stack of items (or simulated stack of items) and/or spacers. For example, a measure of an extent to which the top surface is flat may be used in connection with determining the stability of the stack of items. The placing of a box on a flat surface may result in a stable placement and/or stack of items. As another example, a surface area of a flat region on the top surface may be used in connection with determining the stability or expected stability of the placement of an item on the stack of items. The larger a flat region on a top surface of the stack of items is relative to a bottom surface of an item being placed on the stack of items, the greater the likelihood that the stability of the stack of items will satisfy (e.g., exceed) a threshold stability value.

According to various embodiments, system 100 generates a model of a pallet or a stack of one or more items on the pallet, and the spacer or spacer material is determined to be placed in connection with palletization of one or more items based at least in part on the model of the pallet or the stack of one or more items on the pallet. System 100 may generate a model of at least a top surface of a pallet or a stack of one or more items on the pallet, determine a set of N items to be placed next on the pallet (e.g., N being a positive integer), determine that placing one or more spacers in connection with placing the set of N items on the pallet will result in an improved stack of items on the pallet compared to a resulting stack of placing the set of N items without spacers, generate one or more control signals to cause the actuator to dispense the quantity of spacer material corresponding to the one or more spacers, and provide the one or more control signals to the actuator in connection with placing the set of N items on the pallet.

According to various embodiments, variation in items (e.g., types of items) among items to be palletized may complicate the palletization of the items in a stable manner (e.g., a manner according to which the stability of the stack of items satisfies a threshold stability value). In some embodiments, control computer 118 may only be able to forecast a certain number of items that are to be palletized. For example, the system may have a queue/buffer of N items to be palletized, where N is a positive integer. N may be a subset of a total number of items to be stacked on a pallet. For example, N may be relatively small in relation to the total number of items to be stacked on the pallet. Accordingly, system 100 may only be able to optimize the stacking of items using the next N known items. For example, system 100 may determine a plan to stack one or more items according to the current state of the stack of items (e.g., a current model) and one or more attributes associated with the next N items to be stacked. In some embodiments, the use of one or more spacers may provide flexibility in the manner in which the next N items are to be stacked and/or may improve the stability of the stack of items.

Various embodiments include palletization of a relatively large number of mixed boxes or items on a pallet. The various boxes and items to be palletized may have different attributes such as heights, shapes, sizes, rigidity, packaging type, etc. The variations across one or more attributes of the various boxes or items may cause the placement of the items on a pallet in a stable manner to be difficult. In some embodiments, system 100 (e.g., control computer 118) may determine a destination location (e.g., a location at which an item is to be placed) for an item having a greater surface area (e.g., a larger bottom surface) than the boxes or other items beneath the item being placed. In some embodiments, items having different heights (e.g., different box heights) may be placed on relatively higher areas of the pallet (e.g., a height greater than a height threshold value equal to a maximum pallet height multiplied by 0.5, a height greater than a height threshold value equal to a maximum pallet height multiplied by ⅔, a height greater than a height threshold value equal to a maximum pallet height multiplied by 0.75, a height greater than a height threshold value equal to a maximum pallet height multiplied by another predefined value).

According to various embodiments, a machine learning process is implemented in connection with improving spacer material dispensing/usage strategies (e.g., strategies for using spacer material in connection with palletizing one or more items). System 100 may obtain attribute information pertaining to one or more items to be palletized/de-palletized and attribute information pertaining to one or more spacers to be used in connection with palletizing/de-palletizing the one or more items. The attribute information may comprise one or more of an orientation of the item, a material (e.g., a spacer material type), a size, a weight (or expected weight), a center of gravity, a rigidity, a dimension, etc. System 100 may also obtain a source location (e.g., information pertaining to the input conveyor from which the item is to be picked) and may obtain information pertaining to a pallet on which the item is to be placed (or set of pallets from which the destination pallet is to be determined such as a set of pallets corresponding to the order for which the item is being stacked). In connection with determining a plan for picking and placing the item, system 100 may use the information pertaining to the item (e.g., the attribute information, destination location, etc.) to determine a strategy for palletizing the item (e.g., picking and/or placing the item). The palletizing strategy may include an indication of a picking location (e.g., a location on the item at which the robotic arm 102 is to engage the item such as via the end effector) and a destination location (e.g., a location on the pallet/receptacle 106 or stack of items). The palletizing strategy may include a force to be applied to pick the item and/or a holding force by which the robotic arm 102 is to grasp the item while moving the item from a source location to the destination location, a trajectory along which the robotic arm is to move the item to the destination location, an indication of a quantity, if any, of spacer material that is to be used in connection with placing the item at the destination location, and a plan for placing the spacer material. System 100 may use machine learning processes to improve the palletizing strategies based at least in part on an association between information pertaining to the item (e.g., the attribute information, destination location, etc.) and one or more of (i) performance of picking and/or placing the item (e.g., historical information associated with past iterations of picking and placing the item or similar items such as items sharing one or more similar attributes), (ii) performance of a stability of the stack of items after the item is placed at the destination location such as relative to an expected stability generated using a model of the stack of items (e.g., historical information associated with past iterations of palletizing the item or similar items such as items sharing one or more similar attributes), and (iii) performance of a stability of the stack of items after the item and/or spacer material is placed at the destination location such as relative to an expected stability generated using a model of the stack of items (e.g., historical information associated with past iterations of palletizing the item or similar items and/or spacers such as items/spacers sharing one or more similar attributes). In some embodiments, system 100 may use machine learning processes to improve the use of one or more spacers in connection with palletizing strategies based at least in part on an association between information pertaining to the spacers and/or one or more items that are palletized (e.g., the attribute information, destination location, etc.) and a stability performance of palletizing a set of items using one or more spacers relative to an expected stability of the palletizing of the set of items using the one or more spacers (e.g., the expected stability based on a simulation of the palletizing of the items using a model of the stack of items).

The model generated by system 100 can correspond to, or be based at least in part on, a geometric model. In some embodiments, system 100 generates the geometric model based at least in part on one or more items that have been placed (e.g., items for which system 100 controlled robotic arm 102 to place), one or more attributes respectively associated with at least a subset of the one or more items, one or more objects within the workspace (e.g., predetermined objects such as a pallet, a robotic arm(s), a shelf system, a chute, or other infrastructure comprised in the workspace), etc. The geometric model can be determined based at least in part on running a physics engine on control computer 118 to model a stacking of items (e.g., models a state/stability of a stack of items, etc.). The geometric model can be determined based on an expected interaction of various components of the workspace, such as an item with another item, an object, or a simulated force applied to the stack (e.g., to model the use of a forklift or other device to raise/move a pallet or other receptacle on which a stack of items is located).

According to various embodiments, the system determines an estimated state of the stack of items. For example, system 100 determines the estimated state in response to placement of a next item, or in response to placement of N next items, etc. The estimated state can be determined based at least in part on one or more of a geometric model of the stack of items (or of the workspace) and/or sensor data (e.g., data obtained by the vision system of system 100).

In some embodiments, system 100 uses sensor data and geometric data (e.g., a geometric model) in connection with determining a location to place one or more items on a pallet (or in connection with depalletizing one or more items from a pallet). System 100 may use different data sources to model the state of a pallet (or a stack of items on a pallet). For example, system 100 estimates locations of one or more items on the pallet and one or more characteristics (or attributes) associated with the one or more items (e.g., a size of the item(s)). The one or more characteristics associated with the one or more items may include an item size (e.g., dimensions of the item), a center of gravity, a rigidity of the item, a type of packaging, a deformability, a shape, a location of an identifier, etc.

According to various embodiments, system 100 estimates a state (also referred to herein as an estimated state) of a workspace based at least in part on geometric data (e.g., a geometric model of the workspace) and sensor data (e.g., data obtained by one or more sensors deployed in a workspace). In response to obtaining the estimated state of the workspace, system 100 uses the estimated state in connection with moving an item in the workspace. For example, system 100 uses the estimated state to determine a plan and/or strategy for picking an item from a source location and placing the item at a target location (also referred to herein as a destination location).

According to various embodiments, the geometric model is determined based at least in part on one or more attributes for one or more items in the workspace. For example, the geometric model reflects respective attributes of a set of items (e.g., one or more of a first set that are palletized/stacked, and a second set of items that is to be palletized/stacked, etc.). Examples of an item include an item size (e.g., dimensions of the item), a center of gravity, a rigidity of the item, a type of packaging, a location of an identifier, a deformability of the item, a shape of the item, etc. Various other attributes of an item or object within the workspace may be implemented. As another example, the geometric model comprises an expected stability of one or more items stacked on or in the receptacle (e.g., a pallet). The geometric model may include an expected stability of a set of items (e.g., the stack of items) and/or an expected stability of individual items comprised in the stack of items. In some embodiments, system 100 determines an expected stability of an item based at least in part on (i) one or more attributes of the item; and (ii) one or more expected interactions with respect to the item and another item or object (e.g., a pallet) in the workspace. For example, system 100 may determine the expected stability based on a determination of an attribute of another item or object in contact with the item for which the expected stability is being computed. Examples of attributes of other items that may impact the expected stability of a particular item include rigidity, deformability, a size, etc. As an example, if a particular item rests on another item that is rigid, the particular item is likely to have an improved expected stability as compared to a case where the particular item rests on another item that is not rigid or less rigid. As another example, if a particular item rests on another item that is deformable, such as comprised of soft packaging, the particular item is likely to have a lesser expected stability as compared to a case where the particular item rests on another item that is not deformable or less deformable. As another example, if a particular item rests on another item having a top surface area that is greater than a bottom surface area of the particular item, or if a relatively high percentage of a bottom surface of the particular item is supported by a top surface of another item, then the expected stability of the item is relatively high or at least higher than if the particular item has a top surface area smaller than a bottom surface area of the particular item, or if a relatively high percentage of the bottom surface of the particular item is not supported/interacting with a top surface of another item.

In some embodiments, system 100 adjusts the sensor data to account for noise (e.g., sensor noise). System 100 can estimate the noise comprised in the sensor data based at least in part on an empirical analysis of the vision system. For example, an empirical analysis of the performance of the vision system can be performed to determine noise captured in (e.g., inherent in) the sensor data. In some embodiments, system 100 stores a predetermined sensor noise profile associated with the vision system. System 100 can use the sensor noise profile in connection with adjusting the sensor data to account for the noise. For example, system 100 can apply an adjustment to cancel out the expected noise based at least in part on the sensor profile. The empirical analysis of the performance of the vision system can include (i) manually/physically measuring an item or a workspace, (ii) capturing the same using the vision system, and (iii) determining a difference between the manual/physical measurement of the item/workspace and the measurements of the same using the sensor data (e.g., using digital processing, etc.). System 100 may deem the difference between the manual/physical measurement of the item/workspace and the measurements of the same using the sensor data as the noise profile. As an example, system 100 determines a variance in the sensor data and determines the sensor noise profile based at least in part on the variance. The empirical analysis can be performed with respect to a statistically significant set of experiments/measurements. Examples of noise (or inaccuracies in the sensor data) may include (i) imprecision of an image at edges of the field of view of the vision system, (ii) glare/reflection from items or other objects in the workspace, etc.

In some embodiments, system 100 adjusts the geometric model to account for noise (e.g., geometric noise or imprecision arising from translation of the geometric model to the physical world such as via controlling a robotic arm). System 100 can estimate the noise comprised in the geometric model based at least in part on an empirical analysis of the precision of the robotic control or other objects within the workspace (e.g., estimated deformation of a pallet, deviations in placement of a pallet versus a location used in the geometric model, etc.). For example, an empirical analysis of the performance of the control of the robotic arm (e.g., to perform a task such as placing an item) can be performed to determine noise captured in (e.g., inherent in) the geometric model. As an example, system 100 determines a variance in the geometric model and determines the geometric noise profile based at least in part on the variance. In some embodiments, system 100 stores a predetermined geometric noise profile associated with the vision system. System 100 can use the geometric noise profile in connection with adjusting the geometric model to account for the noise. For example, system 100 applies an adjustment to cancel out the expected noise comprised in the geometric model (e.g., noise generated based on controlling a robot, such as robotic arm 102, according to a plan determined based on the geometric model).

In some embodiments, system 100 updates the geometric model after movement (e.g., placement) of each item. For example, system 100 maintains (e.g., stores the geometric model) the geometric model corresponding to a state of the workspace such as a state/stability of a stack of items and location of one or more items among the stack of items. The geometric model uses a current geometric model in connection with determining a plan to move an item, and controlling a robotic arm to move an item. In response to movement of the item, system 100 updates the geometric model to reflect the movement of the item. For example, in the case of de-palletizing a stack of items, in response to a particular item being picked and moved from the stack of items, system 100 updates the geometric model such that the particular item is no longer represented as being on the stack and is comprised in the geometric model at a destination location at which the particular item was placed, or in the event that the destination location is outside the workspace, the geometric model is updated to remove the item. Further, the geometric model is updated to reflect a stability of the stack of items after the particular item has been removed from the stack. As another example, in the case of palletizing a set of items, system 100 updates the geometric model to reflect placement of a particular item on/among a stack of items. System 100 can update the geometric model to include an updated stability of the stack of items based at least in part on the placement of the item on/among the stack of items (e.g., to reflect the interaction that the particular item has with other items or interaction among other items based on placement of the particular item, etc.).

In some embodiments, system 100 updates the current state (e.g., updates based on an update to the geometric model) after (i) movement (e.g., placement) of a predetermined number of items, or (ii) the earlier of movement of the predetermined number of items or detection of an anomaly such as an anomaly that satisfies one or more anomaly criteria (e.g., the extent of the anomaly exceeds an anomaly threshold, etc.). The predetermined number of items (e.g., X items, X being a positive integer) can be set based on user preferences, a robot control system policy, or otherwise determined based on empirical analysis of placement of items. As an example, the predetermined number of items is set based on a determination that the number of items results in an optimal/best result with respect to a predetermined cost function (e.g., a cost function reflecting an efficiency, a stability, expected change in stability, etc.). As an example, system 100 determines a current estimated state and uses the current estimated state to determine a plan for moving the next X items, and after moving the X items (e.g., the stacking or de-stacking of the items), system 100 determines an updated estimated state (e.g., a geometric update/model to reflect placement of the X items). System 100 determines the updated state based at least in part on a combination of the geometric model and the sensor data (e.g., a current geometric model and current sensor data, etc.). System 100 then uses the updated state in connection with determining a plan and controlling a robotic to place a next set of items in accordance with the plan.

In some embodiments, the frequency by which system 100 updates the estimated state is dynamically determined. For example, system 100 dynamically determines the value X corresponding to the number of items after movement of which the system updates the estimated state. In some embodiments, system 100 dynamically determines the value X (e.g., corresponding to an update frequency of the estimated state) based at least in part on one or more attributes of items (e.g., an attribute of a previously moved/placed item, and/or an attribute of an item to be moved). As an example, system 100 dynamically determines the value X based on a determination that an irregularly placed item or deformable item was placed before (e.g., immediately before, etc.) the set of X items are placed using the current estimated state, or the set of X items comprises an irregularly shaped item or deformable item.

In connection with determining placements (e.g., plans corresponding to the placements) for a set of items and controlling robotic arm 102 to pick and place the set of items in accordance with the placements, system 100 determines a state space, an action space, and a search space. System 100 determines the search space based at least in part on determining various placement locations and/or orientations for the set of items. System 100 can further determine the search space based on a change in an order of placement of items in the set of items if system 100 is configured to permit a buffering of one or more items.

Determining a plan for picking and placing a set of items (e.g., palletizing the set of items) includes determining a placement location (e.g., a destination location at which the item is to be placed) and an orientation according to which the item is to be placed. In some embodiments, the determining, or updating, the plan for picking and placing a set of one or more items includes assessing various placement locations and orientations for items in the set of items. System 100 determines a search space based on (i) a state space for a state of the pallet or other location at which the set of items are to be placed, and (ii) an action space corresponding to the placement of the respective items in the set of items at the corresponding destination locations and orientations. For example, system 100 determines a set of plans for palletizing the set of items by determining corresponding placements (e.g., placement locations and orientations, etc.) for each item comprised in the set of items. As another example, system 100 determines a plurality of combinations/permutations of placements (e.g., placement locations and orientations, etc.) for each item in the set of items (or N items of the set of items, N being an integer). The determining the plan can further comprise determining the expected stability of a stack of items comprising at least part of the set of items placed in the corresponding destination locations and orientations. In some embodiments, system 100 performs a plurality of simulations respectively corresponding to the various combinations/permutations for placing/orienting the set of items. The plan is determined based at least in part on a best (e.g., optimal) combination/permutation of destination locations and orientations. The best combination/permutation of destination locations and orientations may be selected based on a cost function such that a cost of the best combination/permutation is the lowest cost combination/permutation or less than a cost threshold (e.g., an absolute threshold, a percentile of costs among the various costs for the different combinations/permutations, etc.).

In some embodiments, system 100 determines a search space for placement of a set of N next items, where N is a positive integer. As an example, if items are delivered to a workspace for a robot to pick and place at destination locations, system 100 may be able to determine the next M items to be placed, where M is a positive integer. M is greater than or equal to N (e.g., the next N items may be a subset of the next M items). System 100 may determine the next M items based on sensor data obtained by one or more sensors (e.g., the vision system) in the workspace. In some embodiments, system 100 determines the next N items based on a manifest or other predefined list of items that are to be picked and placed (e.g., palletized).

In some embodiments, system 100 represents the search space as a tree according to which each node corresponds to a different combination of placements for the set of items. System 100 determines the search space based at least in part on a state space and an action space. The state space corresponds to a current state of the workspace (e.g., a current state of the pallet). The action space corresponds to a space defined by the placement(s) of a set of items (e.g., placement locations and orientations, etc.). The root node is a current state of the workspace (e.g., a current state of the pallet). The first step after the root node corresponds to branches/nodes for the various permutations of placement locations and orientations for placement of the first next item. The second step after the root node corresponds to branches/nodes for the various permutations of placement locations and orientations of the second next item.

In some embodiments, system 100 represents the search space as a Markov decision process according to which each node corresponds to a different combination of placements for the set of items. For example, if system 100 does not have knowledge of the full set of items that are to be picked and placed, system 100 implements a Markov decision process because there is uncertainty with respect to future items to be picked and placed.

The placement of the set of items (e.g., destination locations and orientations) is selected by performing a search within the search space. For example, system 100 performs a search within the search space to identify the best/lowest cost solution or a good-enough solution such as a solution that satisfies a predefined cost threshold. However, traversing the entire search space including all possible combinations of placement locations and orientations can be extremely computationally expensive and can add significant latency into the determination of a plan for placing an item(s). For example, in the case that the search space is represented as a tree, the traversing the various branches of the tree can be inefficient. The search space can grow exponentially as the number of items increases and the pallet size increases, etc. In some embodiments, system 100 bounds the search space within which system 100 selects a placement(s) (e.g., placement location, orientation, etc.). However, bounding the search space too much can lead to a suboptimal number of combinations/permutations of placements for a set of items from which a placement of a next item is to be determined.

According to various embodiments, system 100 bounds the search space to obtain a more computationally reasonable search space (e.g., to find a more computationally reasonable way to determine an optimal position for an item to be placed). In the case of the search space represented as a tree, system 100 determines a manner by which to prune the tree, and system 100 prunes the tree. As an example, the pruning the tree includes bounding the search space of the tree such that system 100 excludes from consideration as possible placement locations/orientations those states corresponding to pruned branches/nodes. In some embodiments, system 100 restricts analysis of potential placements (locations and orientations), or searches for a best placement (e.g., best combination/permutation of destination locations and orientation, best destination location and orientation for placement of the next item to result in a stable placement of the next set of items, etc.) to those placements in the search space that have not been pruned.

In some embodiments, system 100 prunes the search space (e.g., the tree) based at least in part on performing a simulation with respect to the various parts of the search space. As an example, each node in the tree corresponds to placement of an item at a particular placement location and an orientation. In some embodiments, system 100 simulates placement of the item in accordance with the placement location and orientation corresponding to a particular node in the tree. As an example, performing a simulation may include querying a simulation service. The simulation service may be a physics engine, or a model that is trained using machine learning processes based on training data such as information obtained by iterative physical/real-world trials of stacking the item, etc. The simulation service may be an application or other process that runs on the system 100 or on a remote system to which system 100 communicates. In response to performing the simulation, system 100 determines whether to prune the tree at such node. System 100 can determine to prune the tree at such node based at least in part on an expected stability of a stack of items in response to the placement of the item (e.g., the search space may be pruned to remove/rule out placements that are deemed physically unstable). In some embodiments, system 100 obtains (e.g., computes) a cost function value for the placement corresponding to the node. As an example, the cost function can be based at least in part on one or more of (i) an expected stability of the stack of items, (ii) a time for completion of the stack of items, (iii) a satisfaction of whether the stack of items satisfies a predefined criteria or heuristic (e.g., deformable members placed towards the top of the stack, heavy items placed towards the bottom of the stack, irregularly shaped items placed towards the top of the stack, etc.), (iv) collision avoidance or an expected collision (e.g., a determination of whether a trajectory to the placement location would lead to a collision between the item or robotic arm and another), (v) an efficiency of moving the item(s), and (vi) an indication of whether the robot is expected to be configured in an awkward pose when picking, moving, or placing the item for the placement.

In some embodiments, for each node in the tree (or Markov decision process), system 100 simulates placing the corresponding item in accordance with the placement at the node. In response to simulating the placement of the corresponding item, system 100 models the stack of items. For example, system 100 determines an expected stability of the stack of items (e.g., the modeled stack of items). In response to determining the expected stability, system 100 determines whether to prune the node (and nodes/branches that are children to the node). For example, system 100 determines whether to prune the node based at least in part on comparing the expected stability with a predefined stability threshold. If the expected stability is less than the stability threshold, system 100 determines to prune the node. As another example, system 100 determines whether to prune the node based on a value (e.g., the cost) of a cost function corresponding to the placement associated with the node. System 100 compares the cost to a predefined cost threshold. If the cost is higher than a predefined cost threshold, system 100 determines to prune the node.

According to various embodiments, system 100 performs a simulation of placement for the next item (e.g., the first next item in the set of items to be placed). The simulation of the placement is used in connection with determining the first level of nodes branching from the root node (which corresponds to the current state of the pallet/stack of items). Performing simulation of placement of an item is computationally expensive. For example, system 100 queries a physics engine to perform a simulation and receives a result (e.g., a model of an estimated state). Although simulation fidelity is very desirable, high-fidelity simulations of placement (e.g., determining a model of the stack of items based on such placement) are expensive (e.g., computationally expensive, time expensive, etc.).

In some embodiments, for the subsequent level of nodes (e.g., placement of items after the first next item in the set of items) system 100 uses one or more heuristics in connection with determining an expected stability of the estimated state (e.g., the stack of items). The one or more heuristics can be predefined. For example, the one or more heuristics may be defined based on a stacking policy or system preferences. The heuristics may be empirically determined by an administrator and correspondingly preset. In some embodiments, the one or more heuristics are based on an attribute of the corresponding item being logically placed (e.g., according to placement for the node) or items within the stack of items. According to various embodiments, system 100 performs a simulation of the placement of the items only for the first level of nodes branching from the root node, and for N–1 subsequent items, system 100 uses one or more heuristics to determine an expected stability, or an impact on the stability, by placement of the corresponding items according to the placement location and orientation for the respective nodes.

Examples of heuristics can include (i) an expected stability based on placement of a non-rigid or deformable item at or near the bottom of the stack of items, (ii) an expected stability based on placement of a large item at or near the top of the stack of items, (iii) an expected stability based on placement of a heavy item at or near the top of the stack of items, (iv) an expected stability based on placement of a heavy item at or near the bottom of the stack of items, (v) an expected stability based on placement of an irregularly shaped item at or near the bottom of the stack, and (vi) an expected stability based on placement of an irregularly shaped item at or near the top of the stack. Various other heuristics may be implemented. As an example, a heuristic indicates that the stack of items is unstable if a non-rigid or deformable item is placed at or near the bottom of the stack of items. As an example, a heuristic indicates that the stability of the stack of items is not negatively impacted (e.g., at least by a threshold stability amount) by placement of a non-rigid or deformable item placed at or near the top of the stack of items. As an example, a heuristic indicates that the stack of items is unstable if a heavy item is placed at or near the top of the stack of items. As an example, a heuristic indicates that the stability of the stack of items is not negatively impacted (e.g., at least by a threshold stability amount) by placement of a heavy item placed at or near the bottom of the stack of items. As an example, a heuristic indicates that the stack of items is unstable if an irregularly shaped item (e.g., a non-rectangular item, a round item, etc.) is placed at or near the bottom of the stack of items. As an example, a heuristic indicates that the stability of the stack of items is not negatively impacted (e.g., at least by a threshold stability amount) by placement of an irregularly shaped item (e.g., non-rectangular) placed at or near the top of the stack of items.

According to various embodiments, a heuristic is a computationally efficient variation of performing a physical simulation. For example, the heuristic is defined to be similar to performing a simulation of placements.

Using a heuristic to determine an expected stability of a stack of items or an impact to a stability of the stack of items based on a particular placement is relatively efficient, particularly in comparison to performing a simulation of the placement and determining a model of the stack of items based on the simulation.

The determining the stack of items and expected stability using simulated placement for the first next item (e.g., the first level of nodes branching from the root node) and using heuristics for placement of the second or more next items (e.g., the second level nodes and nodes respectively branching from the second level nodes) provides an accurate estimated state for placement of the next item and a cost effective method for populating (e.g., determining an expected stability of impact to the expected stability) the rest of the tree.

Various embodiments use information pertaining to an expected stability of the stack of items at nodes in the tree in connection with whether to prune such node from the tree (or Markov decision process). For example, system 100 traverses the tree starting from the root node, and system 100 iteratively determines for the next nodes whether the stack is expected to be stable (e.g., a stability greater than a stability threshold, a heuristic indicating that the stack is expected to be stable, the absence of a heuristic indicating that the stack is expected to be unstable, etc.). In response to determining that the stack is expected to be stable at a particular node, system 100 can proceed to a next level node (e.g., a node branching from the particular node) and determine whether the stack is expected to be stable at the next-level node. In response to determining that a particular node is expected to be unstable (e.g., an expected stability less than a stability threshold, a heuristic indicating that the stack is expected to be unstable), system 100 prunes the node (and all next-level nodes branching from the particular node).

In some embodiments, system 100 is configured to permit/enable buffering of items, and system 100 determines the search space based at least in part on the combination/permutations of placements of items, including changing an order of placement of items up to a threshold buffer amount. For example, if system 100 is configured to permit buffering of up to two items, system 100 may determine the search space based on selection, from the next three items to be placed, of the first next item to place. System 100 may determine nodes in the search space for each placement order and corresponding combinations/permutations of placement locations and orientations.

In some embodiments, system 100 is configured to not permit/enable buffering of items, and system 100 determines the search space based at least in part on placement of each next item in the order the set of items are provided to the workspace (e.g., to the robot such as via a conveyor).

According to various embodiments, system 100 determines the plan (e.g., a destination location and orientation) for placing the first next item based at least in part on a determination of a best placement of the next N items (e.g., a placement having a highest expected stability and/or lowest cost, etc.). System 100 then controls a robot to pick and place the first next item in accordance with the plan. In response to placing the first next item, system 100 determines a search space for placing the second next item and following items. For example, the search space has a root node corresponding to a stack of the items, wherein the stack of items includes the first next item; the first level nodes of the search space correspond to placements of the second next item. System 100 then determines the expected stability (or impact to the stability) of the stack of items for the nodes within the search space, determines whether/how to prune the search space, and selects the best placement (e.g., highest expected stability, lowest cost, etc.) for the second next item. According to various embodiments, system 100 can iteratively determine the search space, prune the search space, and determine placement of an item for each of the items in the set of items to be placed.

In some embodiments, the system comprises a plurality of zones in which pallets are respectively disposed. The system can contemporaneously determine a pallet/stack of items on which a particular item is to be placed, and pick and place the item to a selected pallet.

Although the foregoing example is discussed in the context of a system palletizing a set of items on one or more pallets, the robotic system can also be used in connection with depalletizing a set of items from one or more pallets.

Figure 2:
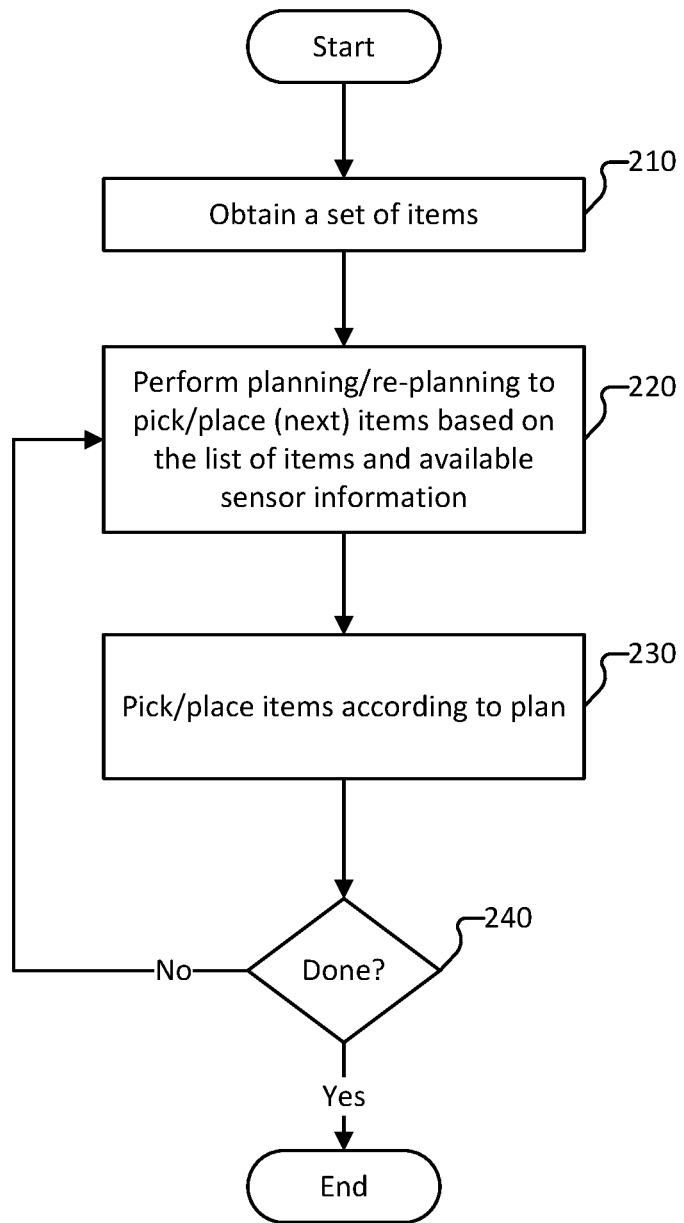
FIG. 2 is a flow chart illustrating a process to palletize one or more items according to various embodiments.

FIG. 2 is a flow chart illustrating a process to palletize one or more items according to various embodiments. In some embodiments, process 200 is implemented at least in part by system 100 of FIG. 1.

At 210, a set of items is obtained. The set of items may correspond to a set of items that are to be collectively palletized on one or more pallets. According to various embodiments, a set of items to be palletized is determined based at least in part on an indication that a manifest or order is to be fulfilled. For example, in response to receiving an order, a list of items for the order may be generated. As another example, a list of items corresponding to a plurality of orders to be sent to the same recipient may be generated.

The items may be located on a shelf or other location within a warehouse. In order to palletize the items, the items are moved to a robotic system that palletizes the items. For example, the items may be placed on one or more conveyors that move the items to within range of one or more robotic arms that palletize the items onto one or more pallets. In response to obtaining the list of items, at least some of the items are associated with a particular robotic arm, a predefined zone corresponding to the particular robotic arm, and/or a particular pallet (e.g., a pallet identifier, a pallet located in a predefined zone), etc.

At 220, planning (or re-planning) is performed to generate a plan to pick/place items based on the list of items and available sensor information. The plan may include one or more strategies for retrieving one or more items on the list of items and placing such items on the corresponding one or more conveyors to carry the items to a robotic arm. According to various embodiments, an order in which the items on the list of items are to be provided to the applicable robotic arm for palletizing is determined based at least in part on the list of items.

The order in which the items are placed on the conveyor may be at least loosely based on the items and an expected stack of the items on one or more pallets (e.g., a modeled estimated state). For example, the system that determines the order in which to place the items may generate a model of an expected stack(s) of the items, and determine the order based on the model (e.g., so as to first deliver items that form the base/bottom of the stack and progressively deliver items higher up the stack). In the case that the items on the list of items are to be palletized on a plurality of pallets, items that are expected to form the base/bottom of the respective stacks (or otherwise be relatively near the bottom of the stacks) may be placed on the conveyor before the items that are expected to be substantially in the middle or top of the stacks. Various items that are to be palletized on the plurality of pallets may be interspersed among each other and the robotic system may sort the items upon arrival at the robotic arm (e.g., the robotic arm may pick and place the items onto an applicable pallet based at least on the item such as the identifier of the item or an attribute of the item). Accordingly, the items corresponding to the base/bottom portion of the corresponding stacks may be interspersed among each other and various items for each pallet/stack may be placed on the conveyor as the corresponding stack is built.

The computer system may generate a model of one or more expected stacks for the items belonging to the list of items. The model may be generated based at least in part on one or more thresholds such as a fit threshold value or stability threshold value, other packing metric (e.g., density), etc. For example, the computer system can generate a model of a stack for which an expected stability value satisfies (e.g., exceeds) the stability threshold value. The model may be generated using a machine learning process. The machine learning process may be iteratively updated based on historical information such as previous stacks of items (e.g., attributes of items in previous stacks, performance metrics pertaining to the previous stacks such as stability, density, fit, etc.). In some embodiments, the model of the stack(s) for palletizing the items on the list of items is generated based at least in part on one or more attributes of the items.

Various attributes of an item may be obtained before or during the determining of the plan. Attributes may include a size of an item, a shape of an item, a type of packaging of an item, an identifier of an item, a center of gravity of an item, an indication of whether the item is fragile, an indication of a top or bottom of the item, etc. As an example, one or more attributes pertaining to at least a subset of the items may be obtained based at least in part on the list of items. The one or more attributes may be obtained based at least in part on information obtained by one or more sensors, and/or by performing a lookup in a mapping of attributes to items (e.g., item types, item identifiers such as serial numbers, model numbers, etc.).

In some embodiments, the generating the model of one or more expected states for the items belonging to the list of items includes generating (e.g., determining) an estimated state for the workspace (e.g., a workspace comprising one or more stacks of items). The computer system determines a plan for moving (e.g., palletizing or depalletizing, etc.) a set of one or more items, and the computer system controls a robot (e.g., a robotic arm) to move the set of one or more items according to the plan. In response to moving the set of one or more items according to the plan, the computer system determines an estimated state for the workspace. For example, the computer system updates the estimated state based at least in part on the movement of the set of items. In some embodiments, the estimated state is determined based at least in part on the geometric model or the sensor data, or a combination of the geometric model and the sensor data in response to a determination that the geometric model and the sensor data are incongruent (e.g., that a difference between the geometric model and the sensor data is greater than a predetermined difference threshold, or comprise an anomaly, etc.). The updated/current estimated state reflects the movement of the set of one or more items (e.g., in the case of palletizing, the updated estimated state includes information pertaining to the placement of the set of one or more items on the stack(s), etc.). In response to determining the updated/current estimated state, the computer system determines a plan for moving another set of one or more items, and the computer system controls the robot to move the other set of one or more items according to the plan.

In some embodiments, the computer system updates the current state (e.g., updates based on an update to the geometric model) after (i) movement (e.g., placement) of a predetermined number of items, or (ii) the earlier of movement of the predetermined number of items or detection of an anomaly such as an anomaly that satisfies one or more anomaly criteria (e.g., the extent of the anomaly exceeds an anomaly threshold, etc.). The predetermined number of items (e.g., X items, X being a positive integer) can be set based on user preferences, a robot control system policy, or otherwise determined based on empirical analysis of placement of items. As an example, the predetermined number of items is set based on a determination that the number of items results in an optimal/best result with respect to a predetermined cost function (e.g., a cost function reflecting an efficiency, a stability, expected change in stability, etc.). As an example, the computer system determines a current estimated state and uses the current estimated state to determine a plan for moving the next X items, and after moving the X items (e.g., the stacking or de-stacking of the items), the computer system determines an updated estimated state (e.g., a geometric update/model to reflect placement of the X items). The computer system determines the updated state based at least in part on a combination of the geometric model and the sensor data (e.g., a current geometric model and current sensor data, etc.). The computer system then uses the updated state in connection with determining a plan and controlling a robotic to place a next set of items in accordance with the plan.

According to various embodiments, the computer system determines the estimated state based at least in part on performing an interpolation between the geometric model and the sensor data. For example, the system performs the interpolation for a particular part of a geometric model and a corresponding part of the sensor data (e.g., the particular part may correspond to a difference between the geometric model and the sensor data that exceeds a difference threshold, or comprises an anomaly).

Various interpolation techniques may be implemented. The particular part of the geometric model may correspond to a particular point (or set of points) in the point cloud for the geometric model, and the corresponding part of the sensor data may be the sensor data for that particular point in the point cloud for the geometric model, etc. In some embodiments, the system performs an adaptive interpolation between the geometric model and the sensor data. In some embodiments, the system performs a non-adaptive interpolation between the geometric model and the sensor data. Examples of adaptive interpolation processing includes: nearest neighbor, bilinear, bicubic, spline, sinc, lanczos, etc. Various other interpolation processing may be performed in connection with determining an estimated state.

In some embodiments, the system uses the current estimated state in connection with determining a next placement (e.g., a placement of a next item of a set of items to be placed). For example, the system determines a search space of possible placements for a next item based at least in part on the estimated state. In some embodiments, the system uses the estimated state as the root node of the search space (e.g., a tree structure representing the search space, or a Markov decision process, etc.), and the system determines the various combinations/permutations of a next item or a set of items (e.g., a set of N items to be placed next).

In response to determining the search space, the system determines whether to prune the search space such as based on a quality of service or other criteria for an amount of resources or latency that is to be allocated to determine a plan for placement of a next item. The system prunes the search space to remove combinations/permutations of placements for a set of items that correspond to sub-optimal placements (e.g., placements that are expected to lead to an unstable stack of items, or the cost for such placements exceeds a predefined cost threshold, etc.). In response to pruning the search space, the system assesses the remaining combinations/permutations of placements in the search space to identify a best placement (e.g., a placement of a next item that is expected to yield a best placement for a set of items, such as a set of N next items). The best placement may be determined based at least in part on one or more of an expected stability of the stack, a cost for the placement of the next item (or a cost for the placement of the set of items), etc.

In response to determining the placement for the next item, the system determines a plan for placing the item at the corresponding destination location and associated orientation.

At 230, items are picked and moved through a (predetermined/planned) trajectory to a location near where the item is to be placed on the corresponding conveyor, and placed at the destination location according to the plan determined and/or updated at 220.

In the example shown, (re-)planning and plan implementation (220, 230) continue until the high-level objective of providing the items on the list of items is completed (240), at which the process 200 ends. In various embodiments, re-planning (220) may be triggered by conditions such as arrival of items that are not expected and/or cannot be identified, a sensor reading indicating an attribute has a value other than what was expected based on item identification and/or associated item model information, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 3:
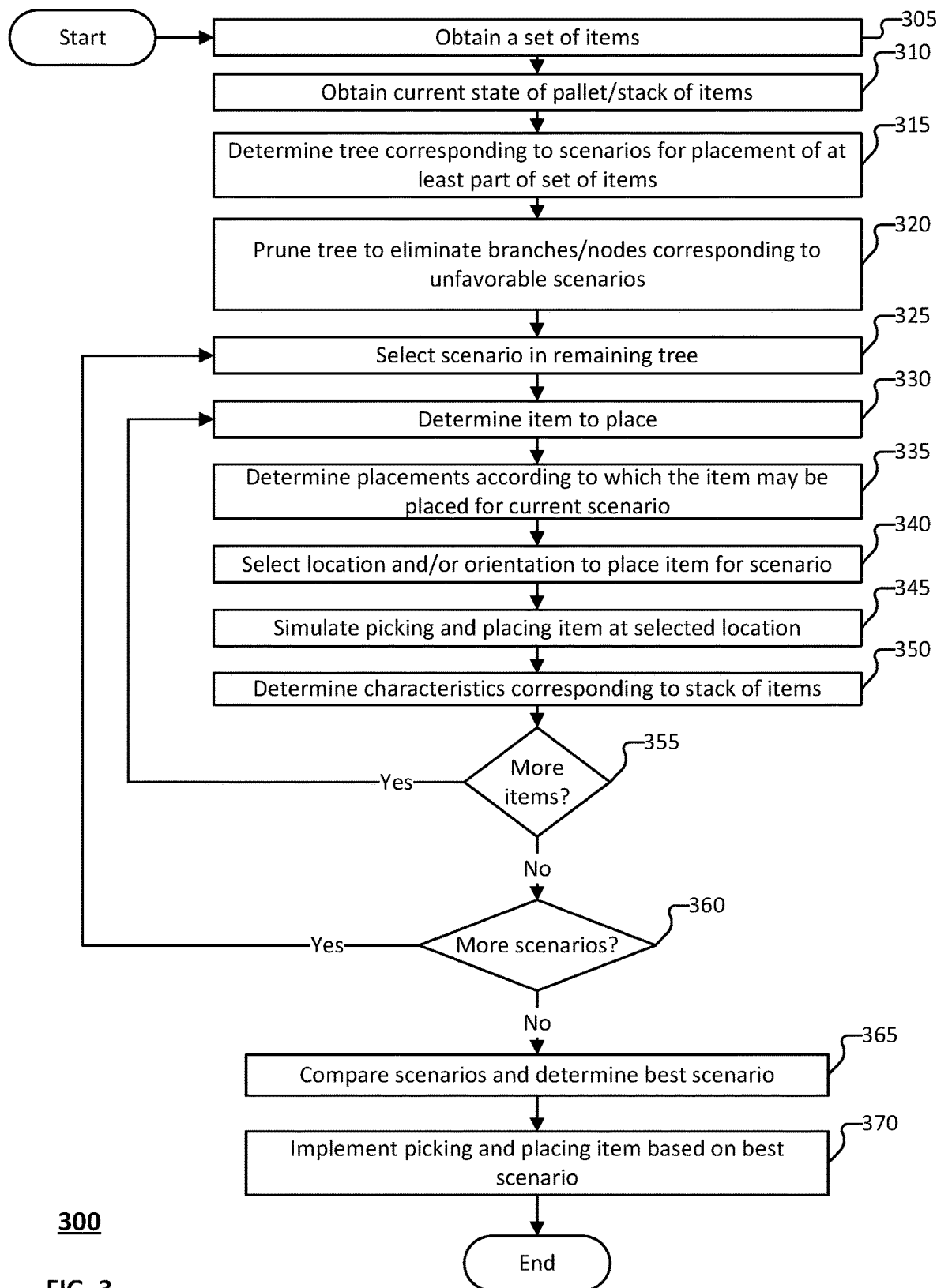
FIG. 3 is a flow chart illustrating a process to determine a plan to move items according to various embodiments.

FIG. 3 is a flow chart illustrating a process to determine a plan to move items according to various embodiments. In some embodiments, process 300 is implemented at least in part by system 100 of FIG. 1.

At 305, a set of items is obtained. In some embodiments, the set of items is determined based at least in part on sensor data such as information obtained by a vision system in the workspace. The system determines the next items to be placed based at least in part on the sensor data (e.g., the system determines the next N items being delivered to the workspace for palletization, etc.). In some embodiments, the set of items is determined based at least in part on a predefined manifest or list of items that are to be picked and placed.

At 310, a current state of the pallet or stack of items is obtained. In some embodiments, the system determines a current estimated state of the pallet or stack of items. The system can determine the estimated state based on using a geometric model for the stack of items, sensor data of the workspace, or a combination of the geometric model and the sensor data. For example, the system performs an interpolation with respect to the geometric model and the sensor data to determine the estimated state.

At 315, the system determines a tree corresponding to scenarios for placement of at least part of the set of items. In some embodiments, the system determines a search space corresponding to the various combinations/permutations of placement (e.g., placement location and orientation) of the next N items.

At 320, the tree is pruned to eliminate branches and/or nodes corresponding to unfavorable scenarios. In some embodiments, the system determines branches/nodes corresponding to placement(s) that are expected to yield an unstable stack of items (e.g., an expected stability less than a predefined stability threshold, a heuristic indicates that the stack of items is expected to be unstable, etc.) or that the placement(s) are expected to have a cost (e.g., according to a predefined cost function) that exceeds a cost threshold. In response to determining branches/nodes corresponding to placement(s) expected to yield an unstable stack of items or a cost that exceeds a threshold cost, the system determines to prune such placements from the search space. For example, the system excludes such placements from further analysis. In some embodiments, 320 is performed after 350.

At 325, a scenario in the remaining tree is selected. In some embodiments, the system selects a combination/permutation of placements in the pruned search space. The system may iterate over 325-360 until all scenarios remaining in the pruned search space are analyzed. In some embodiments, the scenario corresponds to a node in a tree structure representing the search space. In some embodiments, the scenario corresponds to a node in a Markov decision process representing the search space.

At 330, an item to place is determined. In some embodiments, the system determines the next item to place. In some implementations, the system may permit buffering of items, and in such an implementation the system determines the next item from among the set of next items that fits within the buffer criteria.

At 335, the placements according to which the item may be placed for the current scenario are determined. The placements can correspond to the various placement locations and orientations according to which the item may be placed.

At 340, a location and/or orientation to place the item for the scenario is selected. As an example, the system selects a node in the search space corresponding to placement of the item, and determines the location and/or orientation corresponding to the selected node.

At 345, picking and placing the item is simulated. In some embodiments, in response to selecting a placement of the item (e.g., determining a placement corresponding to a node in the search space), the system simulates the picking and placing of the item. The system can use a geometric model in connection with simulating the picking and placing of the item. If the item being placed is the first next item, the system can use the geometric model corresponding to the current estimated state to model placing the item among the existing stack of items. If the item being placed is subsequent to the first next item, the system simulates placement of such item based on using a geometric model corresponding to the current estimated state updated to reflect the logical (e.g., theoretical) placement of the first next item.

At 350, one or more characteristics corresponding to the stack of items are determined. For example, the system determines the characteristics of the stack of items corresponding to the scenario based at least in part on the model of the stack of items generated based on the simulation of the placement of the item. Examples of the characteristics pertaining to the stack of items include (i) an expected stability, (ii) a cost, (iii) a time to perform the placement(s) for the scenario, (iv) an indication of whether a collision is expected to occur if the placement is performed, (v) an indication of whether the robot is expected to be positioned in an awkward or inefficient pose during placement of the item, etc.

At 355, the system determines whether simulation of placement of more items is to be performed. For example, the system determines whether any items in the set of items (or the set of next N items) remain to be placed according to the scenario. In response to determining that simulation of placement of more items is to be performed, process 300 returns to 330 and process 300 iterates over 330-355 until no further simulations of placement of items are to be performed for the selected scenario. In response to determining that no additional items exist, process 300 proceeds to 360.

At 360, the system determines whether additional scenarios for placement of the set of items exist. For example, the system determines whether other orders or combinations/permutations of stacking the items remain within the search space. In response to determining that additional scenarios exist, process 300 returns to 325 and process 300 iterates over 325-360 until no further scenarios exist. In response to determining that no additional scenarios exist, process 300 proceeds to 365.

At 365, the various scenarios within the search space are compared and a best scenario is determined. The system can determine the best scenario (e.g., the placement of the set of items, or of the next item, which is expected to yield a best result) based at least in part on the one or more characteristics corresponding to the stack of items for the various scenarios. For example, the system determines a placement that yields a highest expected stability. As another example, the system determines a placement that yields a lowest cost according to a predefined cost function. As another example, the system determines the best scenario to be the first placement traversed in the search for which the expected stability satisfies a stability criteria (e.g., a stability greater than a stability threshold, absence of a heuristic that would indicate the stack of items is unstable, etc.) and/or satisfies a cost criteria.

At 370, the picking and placing of the item according to the best scenario is implemented. In some embodiments, the system determines a plan for placing the item based on the placement location and orientation for the scenario.

Figure 4A:
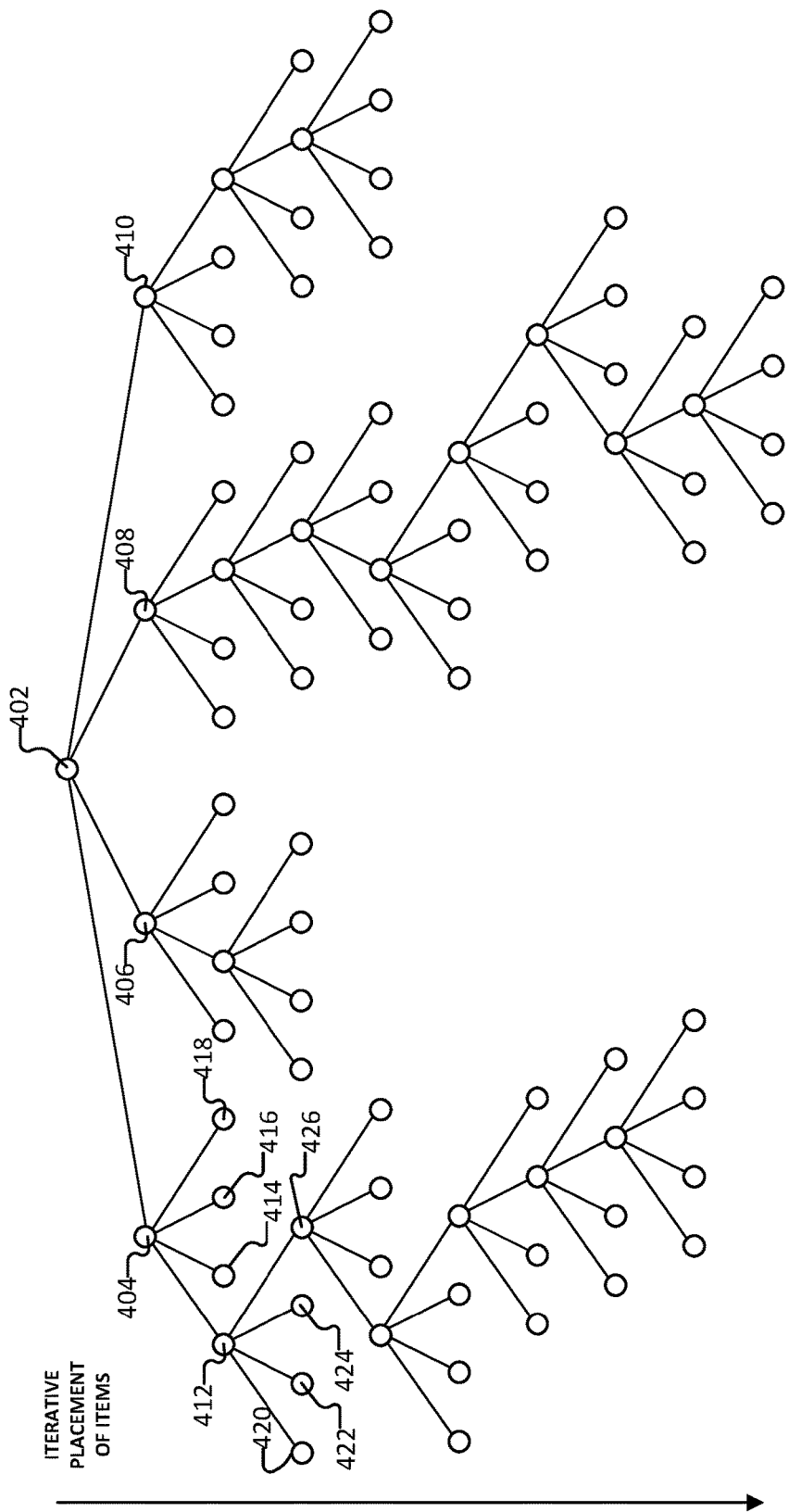
FIG. 4A is a tree corresponding to different states or placements of items according to various embodiments.

FIG. 4A is a tree corresponding to different states or placements of items according to various embodiments. In some embodiments, system 100 of FIG. 1 determines or uses search space 400 in connection with determining a placement of a current item (e.g., a next item from among a set of items to be placed).

In the example illustrated in FIG. 4A, search space 400 is represented in a tree structure. Search space 400 comprises a plurality of nodes, and each node may correspond to a scenario of placement of an item and each branch may correspond to a place of a current item at a particular item and in a particular orientation.

Search space 400 comprises root node 402. Root node 402 corresponds to a current state of the pallet/stack of items. For example, the system queries a state estimation service/ module to obtain an estimated state, and uses such estimated state as the state at root node 402.

Figure 4B:
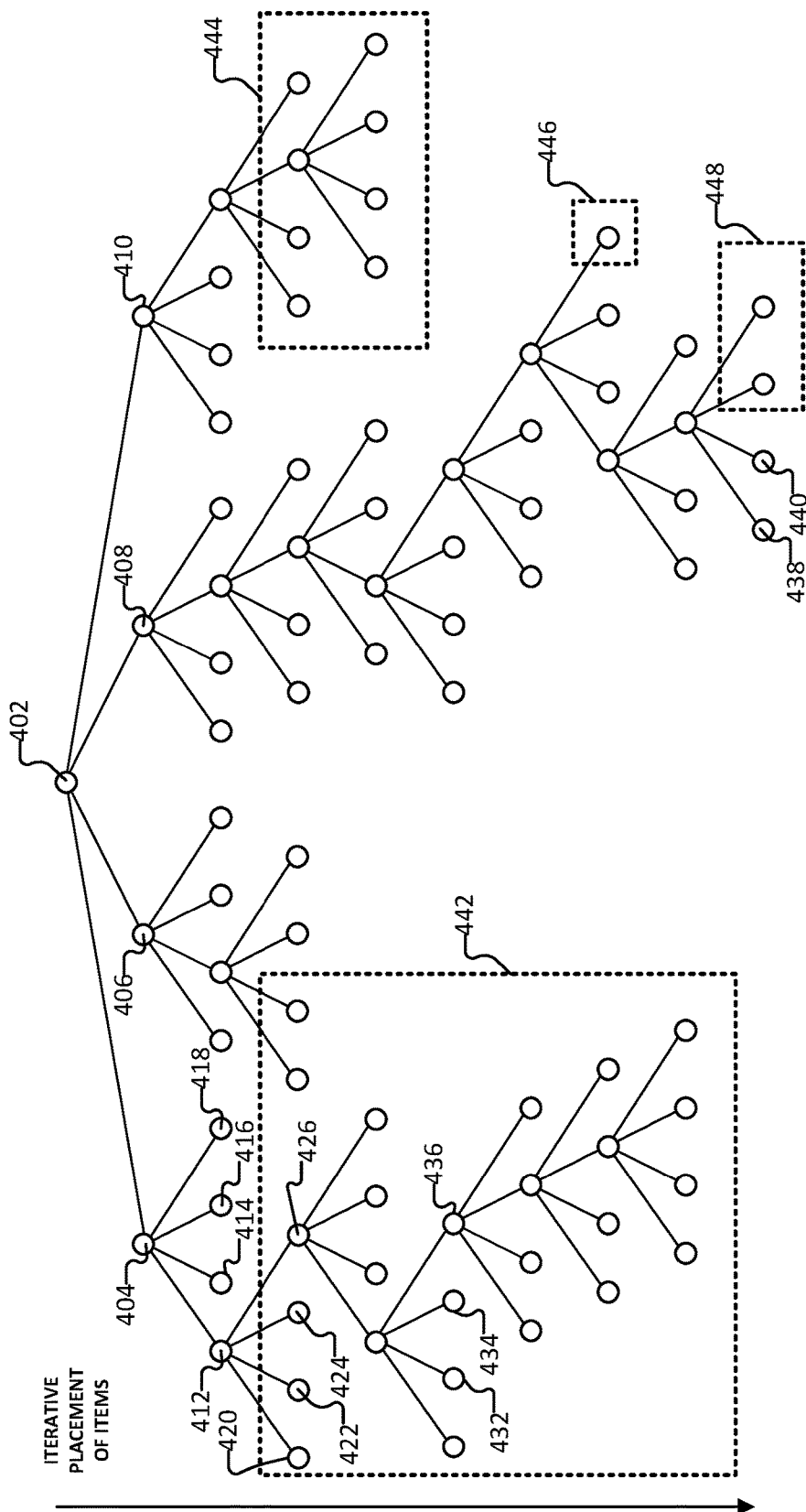
FIG. 4B is a tree corresponding to different states or placements of items according to various embodiments.

In response to determining the root node, the system iteratively determines placements for a set of next items. For example, the system progresses through the different orders of the tree based on placement of different next items. Nodes 404, 406, 408, and 410 correspond to placement of a first next item (e.g., the item for which the system is determining a best placement). As an example, nodes 404, 406, 408, and 410 are first-order nodes respectively corresponding to different placements of a first next item (e.g., different locations and/or different orientations, or different items in the case that the system is permitted to buffer some items). As illustrated in FIGS. 4A and 4B, each of nodes 404, 406, 408, and 410 have second-order nodes respectively branching therefrom. For example, nodes 412, 414, 416, and 418 branch from node 404. Each of the second-order nodes respectively correspond to different placements of a second next item (e.g., different locations and/or different orientations, or different items in the case that the system is permitted to buffer some items). As the system determines placements corresponding to each node, the system determines nodes that branch from the nodes for placements of the remaining items to be simulated. For example, in response to determining the placement for node 412, the system determines the nodes 420, 422, 424, and 426 (e.g., the system determines estimated states and associated information for the nodes).

If the system were to analyze the stability at each node in search space 400, such an analysis may be computationally expensive. Accordingly, as illustrated in FIG. 4B, various embodiments prune the search space to limit the number of nodes for which the state/stability is to be determined in connection with determining placement of an item (e.g., the first next item).

FIG. 4B is a tree corresponding to different states or placements of items according to various embodiments. In some embodiments, system 100 of FIG. 1 determines or uses search space 430 in connection with determining a placement of a current item (e.g., a next item from among a set of items to be placed).

The system determines search space 430 based on determining whether to prune and/or a manner by which to prune search space 400. Segmented areas 442, 444, 446, and 448 correspond to areas of the tree that the system has determined to be unfavorable scenarios and thus pruned from search space 400 (e.g., the tree).

In some embodiments, the system determines whether a node corresponds to a favorable or unfavorable scenario based on one or more of (i) a simulation of the state of the stack of items for the placements associated with the node, and (ii) one or more heuristics. In some embodiments, the system simulates the state of the stack of items for the first-order nodes (e.g., 404, 406, 408, and 410) in connection with determining an estimated state and an expected stability of the stack of items. In some embodiments, for all nodes (e.g., 412, 414, 416, 418, 420, 422, 424, 426, etc.) having an order higher than the first order nodes, the system uses one or more heuristics to determine whether the corresponding placement is expected to be an unfavorable scenario (e.g., expected to result in a stable or unstable stack, expected to have a significant cost such as a cost higher than a cost threshold, expected to cause the robot to be positioned in an awkward pose, etc.).

According to various embodiments, in response to determining a state, an expected stability, and/or a result of an analysis of the favorability of the placement based on one or more heuristics, the system determines whether to prune the corresponding node(s). If the system determines to prune a node, the system prunes the node and all potential nodes that branch from the node. For example, in response to determining that node 426 is to be pruned (e.g., that the node corresponds to an unfavorable scenario), the system correspondingly determines to prune nodes 432, 434, 436, etc. based on such nodes branching directly or indirectly from node 426. In some embodiments, the system determines to prune nodes 432, 434, 436, etc. without further analysis using one or more heuristics. For example, the system determines to prune nodes 432, 434, 436, etc. based on the determination to prune node 426.

In some embodiments, after determining search space 430 (e.g., after pruning the search space 400), the system determines a best placement for the next item (e.g., the item for the first-order nodes). The system can determine the best placement based on one or more of an expected stability, a cost for the placement, the cost of placing the next item and M items after placement of the next item, an expected stability of the stack of items after placement of the next item and the M items after placement of the next item, a favorability of the placements, etc.

In some embodiments, the system determines that the best placement of the next item corresponds to the placement at node 408. For example, the system determines that the placement at node 408 is best based on a determination that the state of the stack of items remains favorable (e.g., cost effective, stable, etc.) through several orders of placements (e.g., the state remains favorable for a placement of the highest number of subsequent items, etc.). In some embodiments, the system determines that nodes 438 and 440 remain favorable through placement of nine different items (e.g., the next item and the M items after the next item, where M is eight in this example). In some embodiments, the system performs a beam search with respect to search space 430 to determine a best placement.

In connection with determining whether to prune a node, the system can implement a pruning criteria. The pruning criteria can include one or more of (i) the state is expected to have a stability less than a stability threshold, (ii) the state violates a heuristic (e.g., a deformable item being placed at or near the bottom of a stack of items, etc.), (iii) a cost for the corresponding placements is expected to exceed a cost threshold, (iv) a robot is expected to be positioned in an awkward pose, (v) an expected density of the stack of items being less than a predefined density threshold, etc.

Figure 4C:
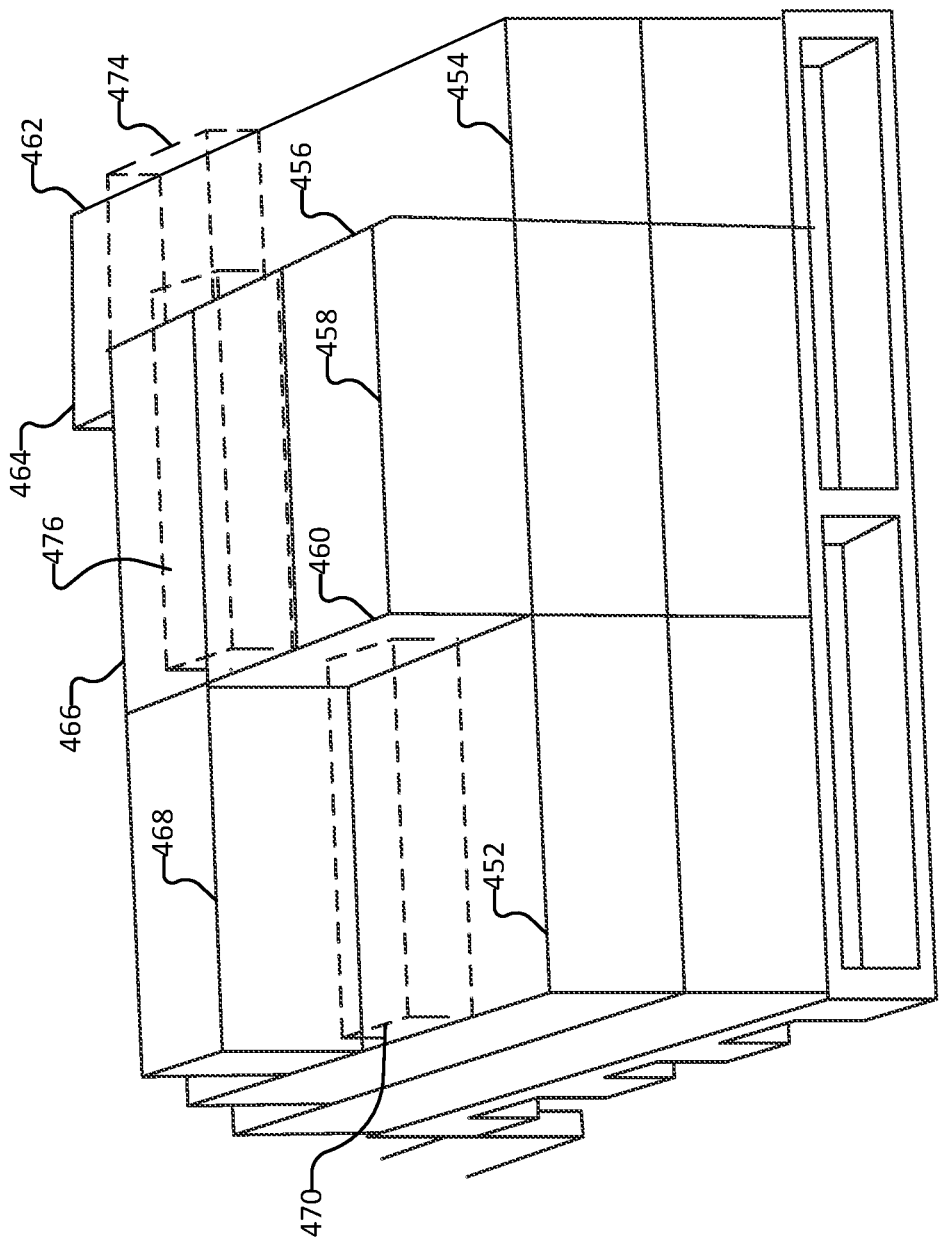
FIG. 4C is a diagram of a stack of items with potential placements according to various embodiments.

FIG. 4C is a diagram of a stack of items with potential placements according to various embodiments. In some embodiments, system 100 of FIG. 1 determines model 450 of the stack of items.

In some embodiments, the system determines model 450 based on a geometric model and/or sensor data. The system can use a machine learning model to obtain model 450.

As illustrated in FIG. 4C, the system uses the current estimated state (e.g., based on the geometric model and/or sensor data) to determine various items in the stack of items and/or edges and vertices defining potential placement locations. For example, the system performs an image processing or machine learning analysis to identify edges such as edges 452, 454, 456, 458, 460, 462, 464, 466, and 468, and/or vertices at which edges meet, etc. In response to identifying one or more of the edges, the system determines potential placements for the current item (e.g., the first next item). The system may also determine potential placements for a set of future items (e.g., a set of N next items, etc.).

In some embodiments, the system can use one or more rules or heuristics in connection with determining placements for the item(s). Examples of the rules or heuristics include (i) a bias/preference for placement of the item at an edge, (ii) a bias/preference for placement of the item next to an item, (iii) a top surface area of a surface on which an item may be placed is greater than a bottom surface of the item to be placed, (iv) a top surface area of a surface area on which an item may be placed is greater than a threshold percentage of a bottom surface area of the item to be placed, (v) a bias/preference to place a large or heavy item at or near a bottom of the stack of items, such as within a threshold distance of the pallet surface, (vi) a bias/preference to place a non-rigid/deformable at or near a top of the stack of items, such as within a threshold distance of a maximum stack height, (vii) an indication that the item fits within the potential location, and (viii) an indication of whether a top surface of an item if placed in a location would be substantially level with an adjacent item, such as within a threshold height of the adjacent item(s), etc. Various other rules/heuristics may be implemented.

As illustrated in FIG. 4C, the system determines that the item (e.g., the current item) can be placed at potential placements 470, 474, and 476. In the example shown, the identified possible placements 470, 474, and 476 are located along edges defined by a top surface (e.g., an exposed surface) of the stack of items.

In some embodiments, in response to determining possible placements 470, 474, and 476, the system uses a machine learning model to evaluate the placements. For example, the system uses a machine learning model to determine a score for a placement based on a scoring function.

FIG. 4D is a diagram of a stack of items with potential placements according to various embodiments. In some embodiments, system 100 of FIG. 1 determines model 480 of the stack of items.

In some embodiments, the system determines model 480 based on a geometric model and/or sensor data. The system can use a machine learning model to obtain model 480. In some embodiments, the system evaluates location 482 and 484 in connection with determining whether such locations are potential placements for item 486. As shown in FIG. 4D, item 486 is an irregularly shaped object. For example, item 486 may be a deformable member and/or have a type of packaging that is non-rigid (e.g., a polybag). Stacking an item on irregularly shaped item 486 may cause instability in the stack of items.

With respect to location 482, the system may determine that such a location is non-feasible at least because the surface is substantially more narrow than a width of item 486 (e.g., a top surface area corresponding to location 482 is less than a threshold percentage of the bottom surface area of item 486). If a top surface of a location is less than a threshold percentage of a bottom surface area of an item to be placed, placement of the item at such a location may lead to instability.

Figure 5:
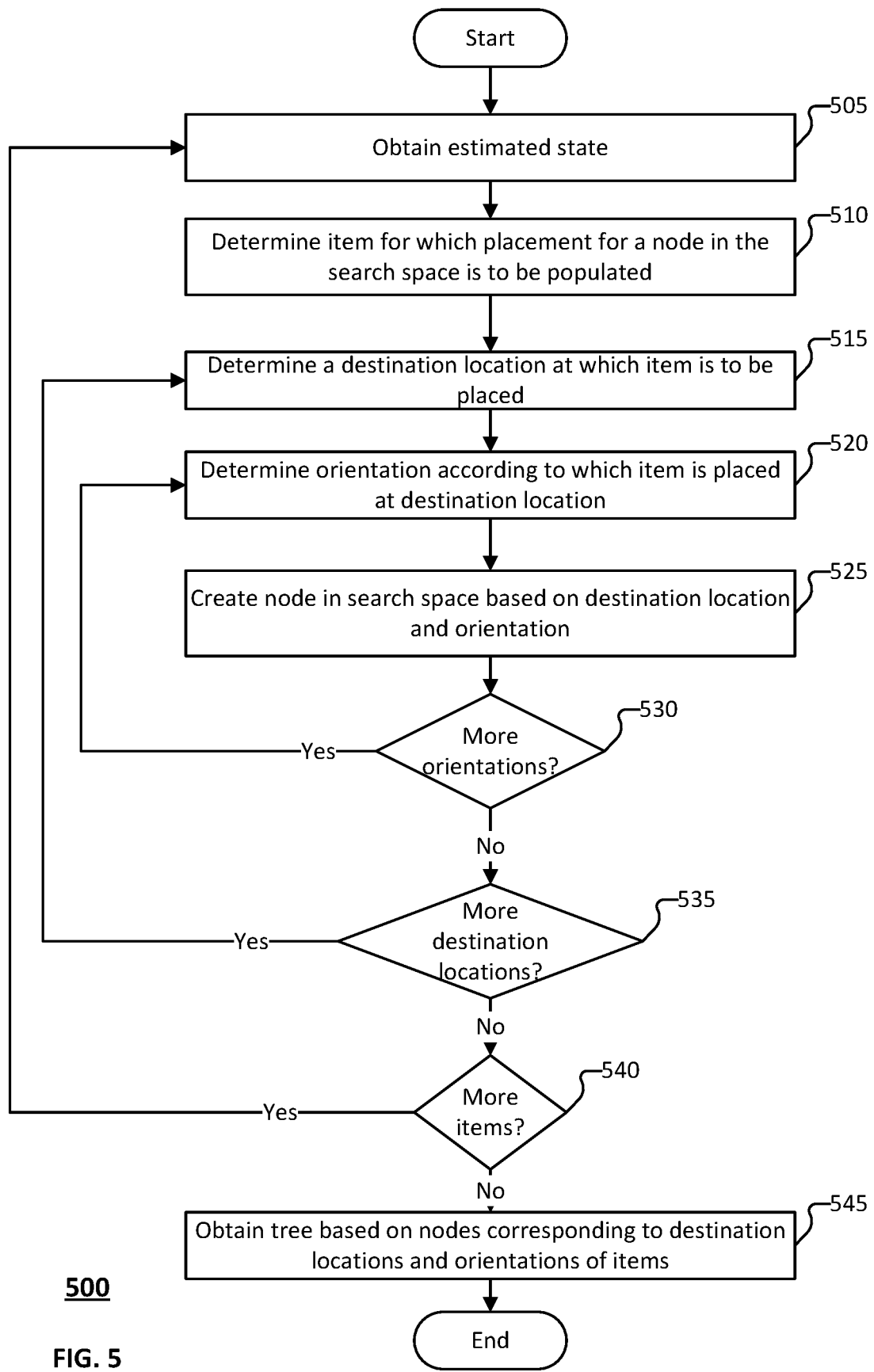
FIG. 5 is a flow chart illustrating a process to determine a tree corresponding to placement of a set of items according to various embodiments.

FIG. 5 is a flow chart illustrating a process to determine a tree corresponding to placement of a set of items according to various embodiments. In some embodiments, process 500 is implemented by system 100 of FIG. 1. In some embodiments, process 500 is invoked in connection with determining a search space for placement of a set of items. For example, process 500 is invoked in response to determining that an item is to be placed on a pallet or stack of items. As an example, the system can determine the search space for each item to be placed (e.g., process 500 is invoked for each item of a set of items to be placed).

At 505, an estimated state is obtained. In some embodiments, the system obtains a current estimated state for the workspace (e.g., the pallet or stack of items). For example, the system can query a state estimation service/module for the estimated state. The estimated state can include a geometric model of the pallet/stack of items.

At 510, an item for which placement corresponding to a node in the search space is to be populated is determined. For example, the system determines a next item that is to be placed. In some embodiments, the next item may correspond to the first next item delivered to the workspace (e.g., by a conveyor). In some embodiments, the next item is selected from a set of items (e.g., set of N items) based on conditions pertaining to item buffering. The conditions pertaining to the item buffering can include (i) a determination of whether buffering is permitted in the system, (ii) a number of items that can be buffered, (iii) a determination of items currently in the buffer, etc. In some embodiments, the item is determined based on a determination of the placement corresponding to the node in the search space (e.g., in the tree structure representing the search space). For example, each node in the search space may correspond to a particular placement (e.g., location and/or orientation) of a particular item.

At 515, a destination location at which the item is to be placed is determined. In response to determining the item to be placed, the system selects a destination location from the set of possible destination locations at which the item can be placed. As an example, the system determines the destination location corresponding to a placement for a particular node in the search space.

At 520, an orientation according to which an item is placed at the destination location is determined. In some embodiments, the system selects an orientation from the set of possible orientations in which the item can be placed at the destination location. As an example, the system determines the orientation corresponding to a placement for the particular node in the search space.

At 525, a node is created in the search space based on the destination location and orientation for the placement of the item. In some embodiments, the system represents the search space in a tree representation, or as a Markov decision process, and the tree is configured to comprise the node corresponding to the destination location and orientation for the placement of the item.

At 530, a determination is made as to whether the item can be placed in additional orientations. The system determines whether additional orientations exist for which a placement is to be included in the search space (e.g., other additional orientations in which the item may be placed at the selected destination location). In response to determining that additional orientations exist at 530, process 500 returns to 520 at which another orientation is selected and process 500 can iterate over 520-530 until no further orientations exist for placement of the item at the destination location.

At 535, a determination is made as to whether the item can be placed at additional destination locations. The system determines whether additional destination locations exist for which a placement is to be included in the search space. In response to determining that additional destination locations exist at 535, process 500 returns to 515 at which another destination location is selected and process 500 can iterate over 515-535 until no further destination locations exist for placement of the item.

At 540, a determination is made as to whether placement for additional items is to be assessed. In some embodiments, the system determines whether the set of items to be placed comprises items for which a set of placements has not yet been determined. In some embodiments, the system determines placement for a set of N next items, and the system determines whether the set of N next items comprises an item for which a set of placements has not yet been determined. In response to determining that placement for additional items is to be assessed at 540, process 500 returns to 505 at which another item is selected and process 500 can iterate over 505-540 until no further placements for items are to be assessed. In response to determining that placement for no further items is to be assessed at 540, process 500 proceeds to 545.

At 545, the search space is obtained based at least in part on the nodes corresponding to placement of the items. For example, the system determines the search space comprising nodes corresponding to various placements (e.g., destination locations and/or orientations) of a set of items. The system can use the search space in connection with determining placement of a current item.

Figure 6:
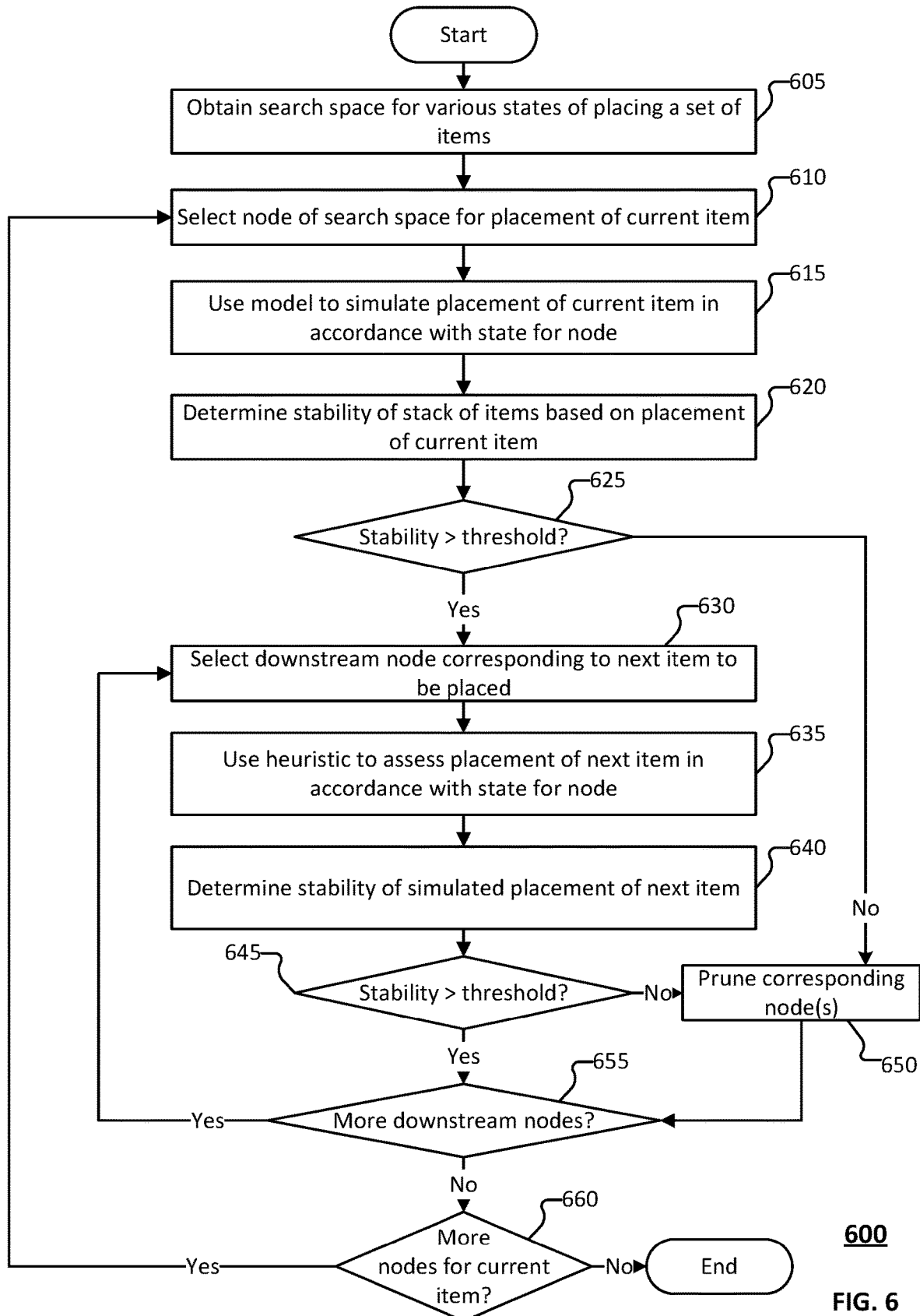
FIG. 6 is a flow chart illustrating a process to prune nodes of a tree for placement of a set of items according to various embodiments.

FIG. 6 is a flow chart illustrating a process to prune nodes of a tree for placement of a set of items according to various embodiments. In some embodiments, process 600 is implemented by system 100 of FIG. 1. In some embodiments, process 600 is invoked in connection with determining a placement and/or plan for placing an item.

At 605, a search space for various states of placing a set of items is obtained. In some embodiments, the system determines the search space for the various combinations/permutations of placement of a set of items. As an example, the search space is obtained based on invoking process 500 of FIG. 5. In some embodiments, the search space is represented as a tree structure or a Markov decision process.

At 610, a node of the search space for placement of a current item is selected. In some embodiments, the node of the search space corresponds to a placement of a particular item. For example, the node of the search space corresponds to placement of a particular item at a particular location and in a particular orientation. As another example, the node of the search space corresponds to a state of a stack of items in response to placement of a particular item at a particular location and in a particular orientation.

At 615, a model is used to simulate placement of the current item in accordance with a state for the node. In response to determining the placement location and orientation associated with a particular node, the system simulates the placement of the item in accordance with the location and the orientation. The model can be a geometric model that is updated based on the placement of the current item. In some embodiments, the system queries a state estimation service/module for an updated state in view of the placement.

At 620, a stability of the stack of items is determined based on the placement of the current item. In some embodiments, the system determines the expected stability of the stack of items based on simulating the placement (e.g., calling a physics engine to simulate the stability) and/or one or more heuristics.

At 625, a determination is made as to whether a stability of the stack of items is greater than a stability threshold. In response to modelling placement of the item for the node, the system determines an expected stability of the stack of items and compares the expected stability to a predefined stability threshold. In response to determining that the stability of the stack of items (e.g., the expected stability) is greater than a predefined threshold at 625, process 600 proceeds to 630. Conversely, in response to determining that the stability of the stack of items is not greater than the predefined threshold at 625, process 600 proceeds to 650.

At 630, a downstream node corresponding a next item to be placed is selected. In some embodiments, the system selects a node that branches from the node selected at 610. In the case that the node selected at 610 is a first-order node (e.g., a node that branches directly from the root node of the tree/search space), the node selected at 630 (at least at the first iteration of 630) can correspond to a second-order node, and at subsequent iterations of 630 can include nodes that branch from the second-order node (e.g., third-order nodes, fourth-order nodes, etc.). In some embodiments, the node selected at 630 corresponds to a placement of an item to be placed after the current item (e.g., the first next item of the set of items to be placed).

At 635, a heuristic is used to assess placement of the next item in accordance with the state of the node. In some embodiments, the system uses a heuristic to determine, generally, whether the placement of the next item is expected to negatively impact the stability of the stack of items. In some embodiments, the system uses one or more heuristics to determine whether the stack of items is expected to be stable (e.g., remain stable) after placement of the next item.

In some embodiments, for the higher-order level of nodes (e.g., placement of items after the first next item in the set of items), the system uses one or more heuristics in connection with determining an expected stability of the estimated state (e.g., the stack of items). The one or more heuristics can be predefined. For example, the one or more heuristics may be defined based on a stacking policy or system preferences. The heuristics may be empirically determined by an administrator and correspondingly preset.

Examples of heuristics can include (i) an expected stability based on placement of a non-rigid or deformable item at or near the bottom of the stack of items, (ii) an expected stability based on placement of a large item at or near the top of the stack of items, (iii) an expected stability based on placement of a heavy item at or near the top of the stack of items, (iv) an expected stability based on placement of a heavy item at or near the bottom of the stack of items, (v) an expected stability based on placement of an irregularly shaped item at or near the bottom of the stack, and (vi) an expected stability based on placement of an irregularly shaped item at or near the top of the stack. Various other heuristics may be implemented. As an example, a heuristic indicates that the stack of items is unstable if a non-rigid or deformable item is placed at or near the bottom of the stack of items. As an example, a heuristic indicates that the stability of the stack of items is not negatively impacted (e.g., at least by a threshold stability amount) by placement of a non-rigid or deformable item placed at or near the top of the stack of items. As an example, a heuristic indicates that a stack of items is unstable if a heavy item is placed at or near the top of the stack of items. As an example, a heuristic indicates that the stability of the stack of items is not negatively impacted (e.g., at least by a threshold stability amount) by placement of a heavy item placed at or near the bottom of the stack of items. As an example, a heuristic indicates that the stack of items is unstable if an irregularly shaped item (e.g., a non-rectangular item, a round item, etc.) is placed at or near the bottom of the stack of items. As an example, a heuristic indicates that the stability of the stack of items is not negatively impacted (e.g., at least by a threshold stability amount) by placement of an irregularly shaped item (e.g., non-rectangular) placed at or near the top of the stack of items.

At 640, a stability of the simulated placement of the next item is determined. In some embodiments, the system uses the one or more heuristics to determine an expected stability of the stack of items after placement of the next item. As an example, the system uses the one or more heuristics to qualitatively determine the expected stability of the stack of items. The system can use the heuristic(s) to determine whether placement of the item at the corresponding destination location and orientation will cause the stack of items to become unstable, whether the placement of the item will improve stability, etc.

At 645, a determination is made as to whether a stability of the stack of items is greater than a stability threshold. In response to modelling placement of the item for the node, the system determines an expected stability of the stack of items and compares the expected stability to a predefined stability threshold. In response to determining that the stability of the stack of items (e.g., the expected stability) is greater than a predefined threshold at 645, process 600 proceeds to 655. Conversely, in response to determining that the stability of the stack of items is not greater than the predefined threshold at 645, process 600 proceeds to 650.

At 650, the corresponding node(s) are pruned. In response to determining that the stack of items is not sufficiently stable (e.g., the expected stability is less than a stability threshold, etc.), the system determines to prune the node(s) from the search space. In some embodiments, the pruning of the nodes includes pruning the current node (e.g., for placement of the next item selected at 630, or of the current item selected at 610). In some embodiments, the pruning of the nodes includes pruning the current node and nodes that branch from the current node. The system prunes the corresponding node(s) to remove such node(s) as potential placements for the set of items.

At 655, a determination is made as to whether additional downstream nodes exist. For example, the system determines whether nodes that branch either directly or indirectly from the node selected at 610 exist. In response to determining that additional downstream nodes exist, process 600 returns to 630 at which process 600 iterates over 630-655 until no further downstream nodes exist. In response to determining that no additional downstream nodes exist, process 600 proceeds to 660 at which the system determines whether additional nodes exist corresponding to placement of the current item. For example, the system determines whether the search space (e.g., the tree) has additional nodes that branch directly from the root node. The other nodes for the current item may correspond to different placements, such as different placement locations and/or different orientations.

In response to determining that additional nodes for placement of the current item exist at 660, process 600 returns to 610 and process 600 iterates over 610-660 until no further additional nodes for the placement of the current item exist.

Figure 7:
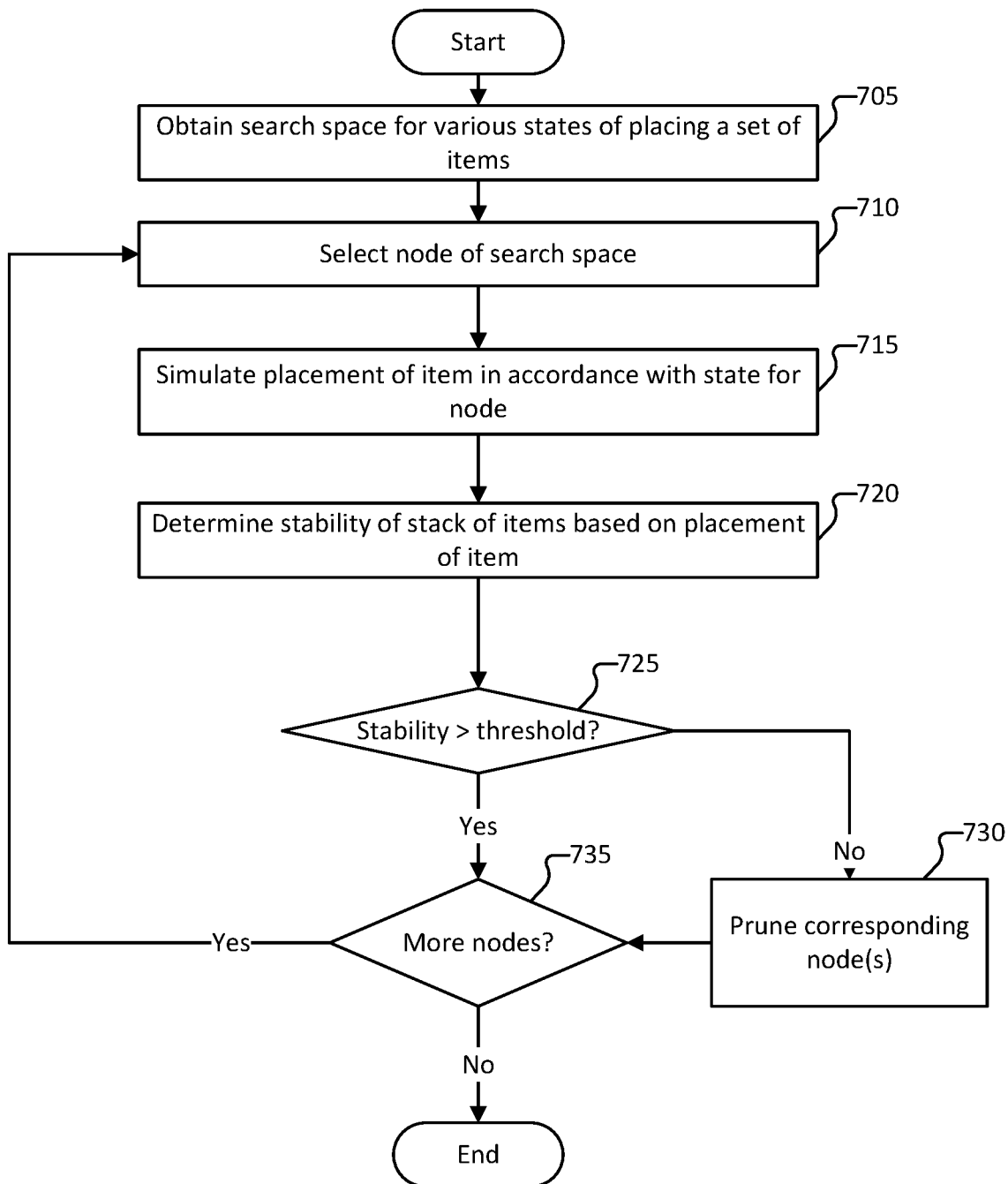
FIG. 7 is a flow chart illustrating a process to prune nodes of a tree for placement of a set of items according to various embodiments.

FIG. 7 is a flow chart illustrating a process to prune nodes of a tree for placement of a set of items according to various embodiments. In some embodiments, process 700 is implemented by system 100 of FIG. 1. In some embodiments, process 700 is invoked in connection with determining a placement and/or plan for placing an item.

At 705, a search space for various states of placing a set of items is obtained. In some embodiments, the system determines the set of items and determines the search space for placement of the set of items. For example, the system determines the various combinations/permutations for placement of the set of items (or a subset of N next items in the set of items to be placed).

At 710, a node of the search space is selected. In some embodiments, the search space is represented as a tree, and the system sequentially selects the nodes branching from a root node (e.g., first order nodes), and the nodes respectively branching directly or indirectly from the first order nodes.

At 715, placement of the item corresponding to the node is simulated in accordance with the state for the selected node. The selected node corresponds to a particular placement of an item (e.g., placement of the item in a particular placement location and/or orientation). The system simulates the placement of the item in accordance with the placement for the node to determine an estimated state of the stack of items or one or more characteristics associated with the stack of items (e.g., an expected stability, a result of an analysis using a heuristic, etc.).

In some embodiments, the simulating the placement of the item includes querying a state estimation service/module to provide a model of the state of the stack of items reflecting placement of the item or qualitatively determining the state of the stack of items based on one or more heuristics.

At 720, the system determines a stability of the stack of items based on the placement of the item (e.g., based on the state of the stack of items corresponding to the selected node). For example, the system determines an expected stability of the stack of items. As another example, the system determines an impact on the stability based at least in part on one or more heuristics.

At 725, a determination is made as to whether a stability of the stack of items is greater than a stability threshold. In response to modelling placement of the item for the node, the system determines an expected stability of the stack of items and compares the expected stability to a predefined stability threshold. In response to determining that the stability of the stack of items (e.g., the expected stability) is greater than a predefined threshold at 725, process 700 proceeds to 735. Conversely, in response to determining that the stability of the stack of items is not greater than the predefined threshold at 725, process 700 proceeds to 730.

At 730, the corresponding node(s) are pruned. In response to determining that the stack of items is not sufficiently stable (e.g., the expected stability is less than a stability threshold, etc.), the system determines to prune the node(s) from the search space.

At 735, a determination is made as to whether additional nodes exist within the search space for which stability is to be determined/analyzed. In response to determining that additional nodes exist, process 700 returns to 710 and process 700 can iterate over 710-735 until the system determines/analyzes the stability for all nodes (all remaining nodes, such as nodes that have not been pruned).

In some embodiments, in response to determining that no additional nodes exist at 735, the system can evaluate the search space to determine a placement that yields a best or optimal result (e.g., a best placement). For example, the system analyzes the nodes remaining in the search space (e.g., nodes that have not been pruned) to select the best placement. In response to determining the best placement, the system can determine a plan for placing the current item in accordance with the best placement, and the system can further control a robot to pick and place the item in accordance with the plan.

Figure 8:
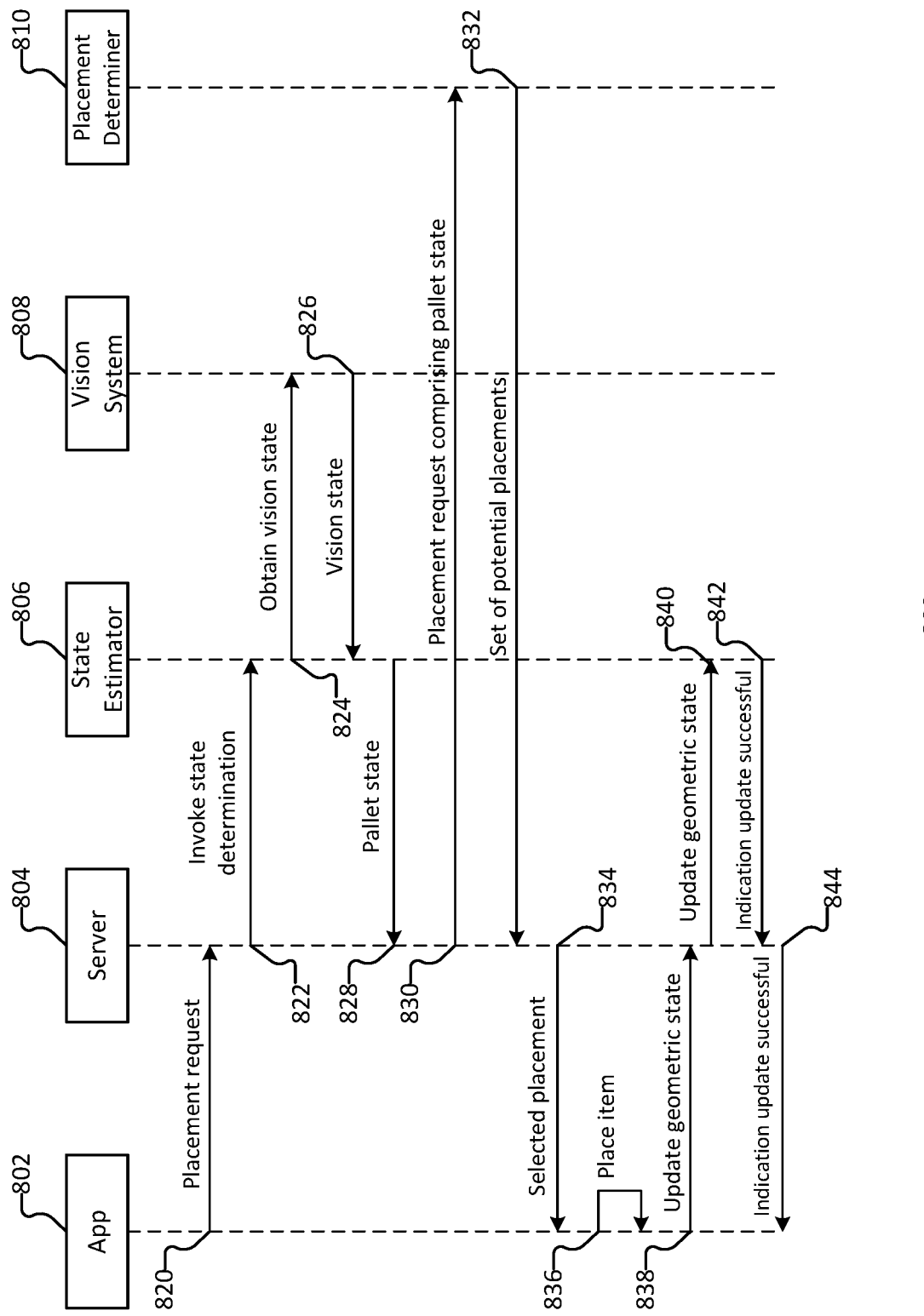
FIG. 8 is a flow diagram illustrating an embodiment of determining an estimate of a state of a pallet and/or stack of items.

FIG. 8 is a flow diagram illustrating an embodiment of determining an estimate of a state of a pallet and/or stack of items. In some embodiments, process 800 is implemented at least in part by system 100 of FIG. 1.

In some embodiments, process 800 is implemented by one or more of an app 802 running on a control system for a robotic arm, server 804, state estimator 806, vision system 808, and placement determiner 810.

At 820, app 802 sends a request to server 804. The request can correspond to a placement request for a plan and/or strategy for placing an item.

In response to receiving the placement request, at 822, server 804 invokes a state determination. For example, server 804 sends a request or instruction to state estimator 806 to determine (and provide) the estimated state. In some embodiments, state estimator 806 is a module running on server 804. In some embodiments, state estimator 806 is a service that is queried by a plurality of different servers/robotic systems. For example, state estimator 806 may be a cloud service.

In response to invoking the state determination, state estimator 806 obtains the vision state. In some embodiments, state estimator 806 sends to vision system 808 a request for a vision state.

In response to receiving the request for the vision state at 824, at 826, vision system 808 provides the vision state to state estimator 806. For example, in response to receiving the request for the vision state, the vision system uses one or more sensors in a workspace to capture a snapshot of the workspace.

In response to receiving the vision state, state estimator 806 determines the pallet state (e.g., an estimated state of the pallet and/or stack of items). State estimator 806 may determine the estimated state based on one or more of a geometric model and the vision state. In some embodiments, state estimator 806 combines the geometric model and the vision state (at least with respect to a part of the stack).

At 828, state estimator 806 provides the pallet state to server 804.

At 830, server 804 sends a placement request comprising the pallet state to placement determiner 810. In some embodiments, placement determiner 810 is a module running on server 804. In some embodiments, placement determiner 810 is a service that is queried by a plurality of different servers/robotic systems. For example, placement determiner 810 may be a cloud service.

At 832, placement determiner 810 provides a set of one or more potential placements to server 804. The set of one or more potential placements may be determined based at least in part on an item(s) to be placed (e.g., attributes associated with the item) and the pallet state (e.g., available locations and attributes of items within the stack of items), etc.

In some embodiments, the set of one or more potential placements is a subset of all possible placements. For example, placement determiner 810 uses a cost function to determine the set of one or more potential placements to provide to server 804. Placement determiner 810 may determine potential placements that satisfy a cost criteria (e.g., have a cost less than a cost threshold) with respect to the cost function.

In response to receiving the set of one or more potential placements, at 834, server 804 selects a placement and sends the selected placement to app 802. For example, the selected placement is provided as a response to the initial placement request at 820.

At 836, app 802 controls a robotic arm to place the item. In some embodiments, app 802 determines a plan to move the item to the selected placement (e.g., based on an attribute(s) of the item and the location corresponding to the selected placement, such as coordinates in the workspace).

At 838, app 802 provides an indication to server 804 to perform an update with respect to the geometric state. For example, app 802 provides confirmation that the placement of the item was performed at 836 and server 804 deems such confirmation to be an indication that an update to the geometric state (e.g., geometric model) is to be invoked.

At 840, server 804 sends to state estimator 806 a request to update the geometric state. For example, server 804 requests that state estimator 806 update the geometric model to reflect placement of the item in accordance with the corresponding plan.

In response to receiving the request to update the geometric state, state estimator 806 performs the corresponding update. At 842, state estimator 806 provides an indication to server 804 that the geometric state was successfully updated.

At 844, server 804 provides to app 802 an indication that the geometric state was successfully updated to reflect placement of the item.

Process 800 may be repeated for a set of items to be stacked.

Although the foregoing examples are described in the context of palletizing or de-palletizing a set of items, various embodiments may be implemented in connection with singulating a set of items and/or kitting a set of items. For example, various embodiments are implemented to determine/estimate a state of the workspace (e.g., chute, conveyor, receptacle, etc.) based at least in part on geometric data and sensor data (e.g., a combination of the geometric data and sensor data, such as an interpolation between the geometric data and sensor data).

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A robotic system, comprising:
   a communication interface configured to receive, from one or more sensors deployed in a workspace, sensor data indicative of a current state of the workspace, the workspace comprising a pallet or other receptacle and a set of zero or more items stacked on or in the receptacle; and
   one or more processors coupled to the communication interface and configured to:
   use the sensor data to estimate a state of one or both of the pallet or other receptacle and the set of zero or more items stacked on or in the receptacle; and
   use the estimated state to generate or update a plan to control a robotic arm to place a next set of items on or in, or remove the next set of items from, the pallet or other receptacle, the plan comprising an ordered sequence of item placements or removals;
   wherein:
   the one or more processors are configured to generate or update the plan at least in part by performing a bounded tree search in which a subset of possible ordered sequences is explored; and the subset is determined by one or both of selecting for exploration tree branches that satisfy one or more selection criteria or omitting from consideration one or more branches that satisfy a pruning criteria, wherein the pruning criteria is associated with a determination that a branch does not comprise a node corresponding to a favorable scenario.

2. The robotic system of claim 1, wherein an item placement comprises a placement of the item in a particular location.

3. The robotic system of claim 1, wherein an item placement comprises a placement of the item in a particular orientation.

4. The robotic system of claim 3, wherein:
the item is a box; and
the item placement is one of six orientations.

5. The robotic system of claim 1, wherein the pruning criteria is associated with instability of one or more items stacked on or in the receptacle.

6. The robotic system of claim 5, wherein the instability is determined based at least in part on one or more historical observations.

7. The robotic system of claim 5, wherein the instability is determined based at least in part on a simulation of stacking or removing at least one of the zero or more items stacked on or in the receptacle.

8. The robotic system of claim 5, wherein the instability is determined based at least in part on one or more predefined heuristics.

9. The robotic system of claim 8, wherein at least one heuristic includes an indication of stacking an item having a weight exceeding a predefined weight threshold on top of an item having a packaging that is deformable.

10. The robotic system of claim 1, wherein the pruning criteria is associated with a packing density less than a predefined packing density threshold.

11. The robotic system of claim 1, wherein the pruning criteria is associated with a determination that stacking items according to a particular sequence of the subset of possible ordered sequences is expected to result in a collision.

12. The robotic system of claim 1, wherein the pruning criteria is associated with a determination that stacking items according to a particular sequence of the subset of possible ordered sequences is expected to result in the robotic arm to move more than a predefined movement threshold to avoid a collision.

13. The robotic system of claim 1, wherein the pruning criteria is associated with a determination that a particular sequence of the subset of possible ordered sequences includes placements that are not along an edge or vertex of an item already placed on the pallet.

14. The robotic system of claim 1, wherein the favorable scenario is determined to be a placement for which a corresponding value for a value function exceeds a predefined favorability threshold.

15. The robotic system of claim 14, wherein the value function is based at least in part on one or more of a packing density, an expected stability, and an expected efficiency of item placement.

16. The robotic system of claim 1, wherein the one or more selection criteria are associated with an expected packing density exceeding a predefined density threshold.

17. The robotic system of claim 1, wherein the one or more selection criteria are associated with one or more predefined heuristics.

18. The robotic system of claim 17, wherein the one or more predefined heuristics include a bias for placing heavy or large items at a bottom of a stack.

19. The robotic system of claim 1, wherein the one or more selection criteria are associated with an expected stability.

20. The robotic system of claim 19, wherein the expected stability pertains to a layer in a stack or a top layer topography.

21. The robotic system of claim 1, wherein the one or more selection criteria are associated with first exploring branches involving a placement of a first subset of one or more items on a far side away from a robot first, and subsequent placement of a second subset of one or more items at a location closer to the robot.

22. The robotic system of claim 21, wherein the first subset is determined based at least in part on performing a beam search of the tree branches, the beam search being limited to N possible placements, and N is a positive integer.

23. The robotic system of claim 1, wherein:
each node of the tree of possible ordered sequences corresponds to a scenario of a placement of items up to that point in the ordered sequence; and
each branch of the tree of possible ordered sequences corresponds to a decision to place a next item at a particular location or in a particular orientation.

24. A method to control a robot, comprising:
receiving, from one or more sensors deployed in a workspace, sensor data indicative of a current state of the workspace, the workspace comprising a pallet or other receptacle and a set of zero or more items stacked on or in the receptacle;
using the sensor data to estimate a state of one or both of the pallet or other receptacle and the set of zero or more items stacked on or in the receptacle; and
using the estimated state to generate or update a plan to control a robotic arm to place a next set of items on or in, or remove the next set of items from, the pallet or other receptacle, the plan comprising an ordered sequence of item placements or removals;
wherein:
generating or updating the plan includes performing a bounded tree search in which a subset of possible ordered sequences is explored; and
the subset is determined by one or both of selecting for exploration tree branches that satisfy one or more selection criteria or omitting from consideration one or more branches that satisfy a pruning criteria, wherein the pruning criteria is associated with a determination that a branch does not comprise a node corresponding to a favorable scenario.

25. A computer program product to control a robot, the computer program product being embodied in a non-transitory computer readable medium and comprising computer instructions for:
receiving, from one or more sensors deployed in a workspace, sensor data indicative of a current state of the workspace, the workspace comprising a pallet or other receptacle and a set of zero or more items stacked on or in the receptacle;
using the sensor data to estimate a state of one or both of the pallet or other receptacle and the set of zero or more items stacked on or in the receptacle; and
using the estimated state to generate or update a plan to control a robotic arm to place a next set of items on or in, or remove the next set of items from, the pallet or other receptacle, the plan comprising an ordered sequence of item placements or removals;

wherein:
generating or updating the plan includes performing a bounded tree search in which a subset of possible ordered sequences is explored; and the subset is determined by one or both of selecting for exploration tree branches that satisfy one or more selection criteria or omitting from consideration one or more branches that satisfy a pruning criteria, wherein the pruning criteria is associated with a determination that a branch does not comprise a node corresponding to a favorable scenario.

26. A robotic system, comprising:

a communication interface configured to receive, from one or more sensors deployed in a workspace, sensor data indicative of a current state of the workspace, the workspace comprising a pallet or other receptacle and a set of zero or more items stacked on or in the receptacle; and one or more processors coupled to the communication interface and configured to:
use the sensor data to estimate a state of one or both of the pallet or other receptacle and the set of zero or more items stacked on or in the receptacle; and use the estimated state to generate or update a plan to control a robotic arm to place a next set of items on or in, or remove the next set of items from, the pallet or other receptacle, the plan comprising an ordered sequence of item placements or removals;

wherein:
the one or more processors are configured to generate or update the plan at least in part by performing a bounded tree search in which a subset of possible ordered sequences is explored; and the subset is determined by one or both of selecting for exploration tree branches that satisfy one or more selection criteria or omitting from consideration one or more branches that satisfy a pruning criteria;

wherein the one or more selection criteria are associated with first exploring branches involving a placement of a first subset of one or more items on a far side away from a robot first, and subsequent placement of a second subset of one or more items at a location closer to the robot.

27. A method to control a robot, comprising:

receiving, from one or more sensors deployed in a workspace, sensor data indicative of a current state of the workspace, the workspace comprising a pallet or other receptacle and a set of zero or more items stacked on or in the receptacle;

using the sensor data to estimate a state of one or both of the pallet or other receptacle and the set of zero or more items stacked on or in the receptacle; and using the estimated state to generate or update a plan to control a robotic arm to place a next set of items on or in, or remove the next set of items from, the pallet or other receptacle, the plan comprising an ordered sequence of item placements or removals;

wherein:
generating or updating the plan includes performing a bounded tree search in which a subset of possible ordered sequences is explored; and the subset is determined by one or both of selecting for exploration tree branches that satisfy one or more selection criteria or omitting from consideration one or more branches that satisfy a pruning criteria;

wherein the one or more selection criteria are associated with first exploring branches involving a placement of a first subset of one or more items on a far side away from a robot first, and subsequent placement of a second subset of one or more items at a location closer to the robot.

* * * * *